United States Patent
Sakaguchi et al.

(10) Patent No.: US 8,209,723 B2
(45) Date of Patent: Jun. 26, 2012

(54) BROADCAST RECEIVING APPARATUS, AND METHOD AND PROGRAM FOR BROADCAST RECEPTION

(75) Inventors: Masami Sakaguchi, Hiroshima (JP); Hiroshi Aoki, Hiroshima (JP); Takahiro Takemoto, Hiroshima (JP)

(73) Assignee: Panasonic Corporation, Osaka (JP)

( * ) Notice: Subject to any disclaimer, the term of this patent is extended or adjusted under 35 U.S.C. 154(b) by 460 days.

(21) Appl. No.: 12/519,200

(22) PCT Filed: Oct. 10, 2008

(86) PCT No.: PCT/JP2008/002886
§ 371 (c)(1),
(2), (4) Date: Jun. 15, 2009

(87) PCT Pub. No.: WO2009/050872
PCT Pub. Date: Apr. 23, 2009

(65) Prior Publication Data
US 2011/0083148 A1    Apr. 7, 2011

(30) Foreign Application Priority Data
Oct. 16, 2007    (JP) .................... 2007-269313

(51) Int. Cl.
*G06F 3/00* (2006.01)
*G06F 13/00* (2006.01)
*H04N 5/445* (2006.01)

(52) U.S. Cl. ............... 725/52; 725/37; 725/38; 725/39; 725/44; 715/700; 715/730; 715/786; 715/788; 715/800

(58) Field of Classification Search ............... 725/42
See application file for complete search history.

(56) References Cited

U.S. PATENT DOCUMENTS

| | | | |
|---|---|---|---|
| 5,900,868 A * | 5/1999 | Duhault et al. | 725/42 |
| 6,384,869 B1 * | 5/2002 | Sciammarella et al. | 348/564 |
| 6,425,129 B1 * | 7/2002 | Sciammarella et al. | 725/38 |
| 2003/0046693 A1 * | 3/2003 | Billmaier et al. | 725/39 |
| 2003/0093497 A1 * | 5/2003 | Ohashi | 709/217 |
| 2004/0019908 A1 * | 1/2004 | Williams et al. | 725/46 |

(Continued)

FOREIGN PATENT DOCUMENTS

JP    08-149384    6/1996

(Continued)

OTHER PUBLICATIONS

English language Abstract of JP 08-149384, Jun. 7, 1996.

(Continued)

*Primary Examiner* — Justin Shepard
(74) *Attorney, Agent, or Firm* — Greenblum & Bernstein, P.L.C.

(57) ABSTRACT

A broadcast receiving apparatus makes it possible to select a desired television program quickly by channel-surfing. The broadcast receiving apparatus outputs information of the received broadcast content as television program information of a channel for which the broadcast content is received, includes an operation detector that detects a channel that selects operation, an operation speed calculator that calculates a channel selecting operation speed from the detected channel selecting operation, a list item count determiner that determines, according to the calculated channel selecting operation speed, the number of channels for which the television program information is displayed, a channel determiner that determines channels to be listed so that the television program information is displayed for the determined number of channels, and a display that outputs the television program information of the determined channels to be listed.

20 Claims, 24 Drawing Sheets

U.S. PATENT DOCUMENTS

| | | | |
|---|---|---|---|
| 2004/0205814 A1* | 10/2004 | Ando et al. | 725/46 |
| 2005/0206658 A1* | 9/2005 | Fagans | 345/660 |
| 2006/0015903 A1* | 1/2006 | MacBeth et al. | 725/46 |
| 2007/0026828 A1 | 2/2007 | Goto | |
| 2007/0269017 A1* | 11/2007 | Umeki et al. | 378/165 |
| 2008/0231750 A1 | 9/2008 | Suzuki | |
| 2009/0172764 A1 | 7/2009 | Okamura | |

FOREIGN PATENT DOCUMENTS

| | | |
|---|---|---|
| JP | 2001-045391 | 2/2001 |
| JP | 2005-192009 | 7/2005 |
| JP | 2007-005873 | 1/2007 |

OTHER PUBLICATIONS

English language Abstract of JP 2005-192009, Jul. 14, 2005.
English language Abstract of JP 2001-045391, Feb. 16, 2001.
English language Abstract of JP 2007-005873, Jan. 11, 2007.

* cited by examiner

FIG. 9
(a) Screen 1 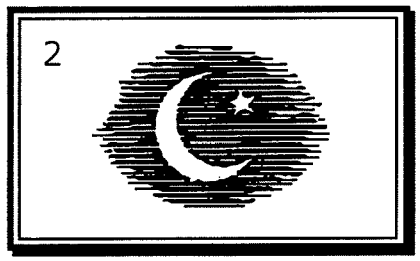
(b) Screen 2 
(c) Screen 3
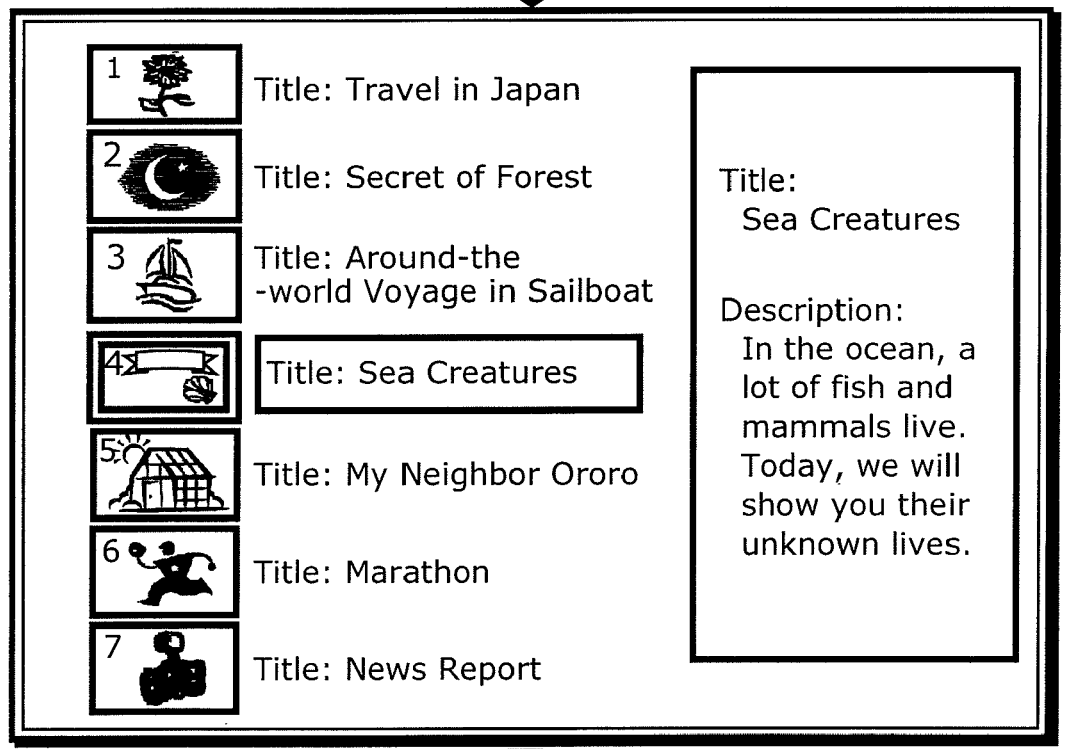
(d) Screen 4 

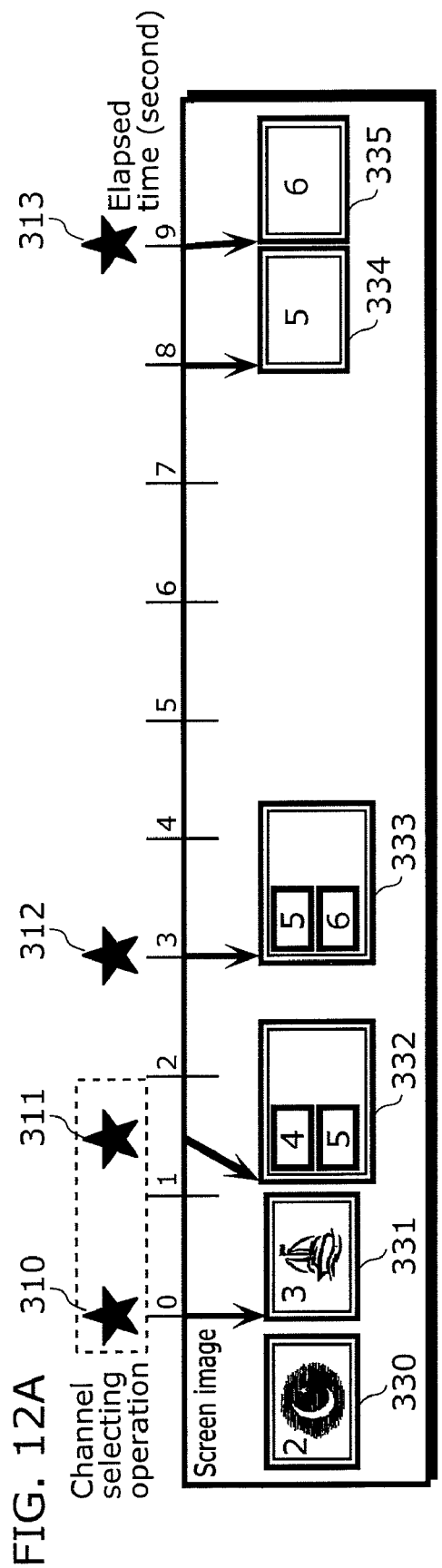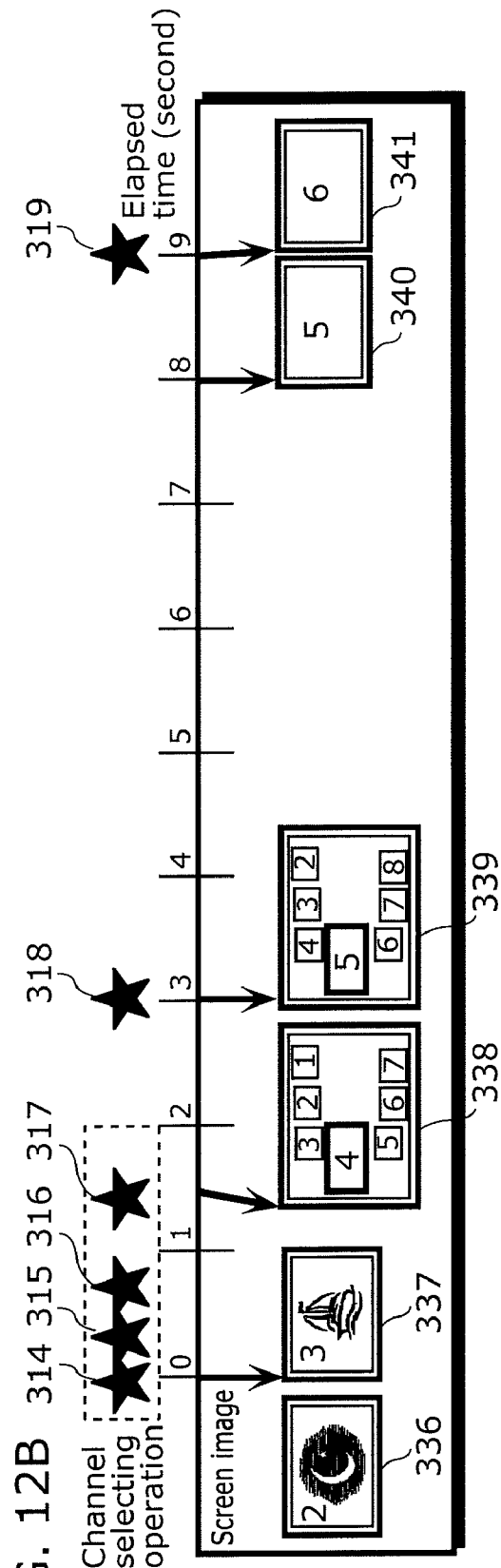

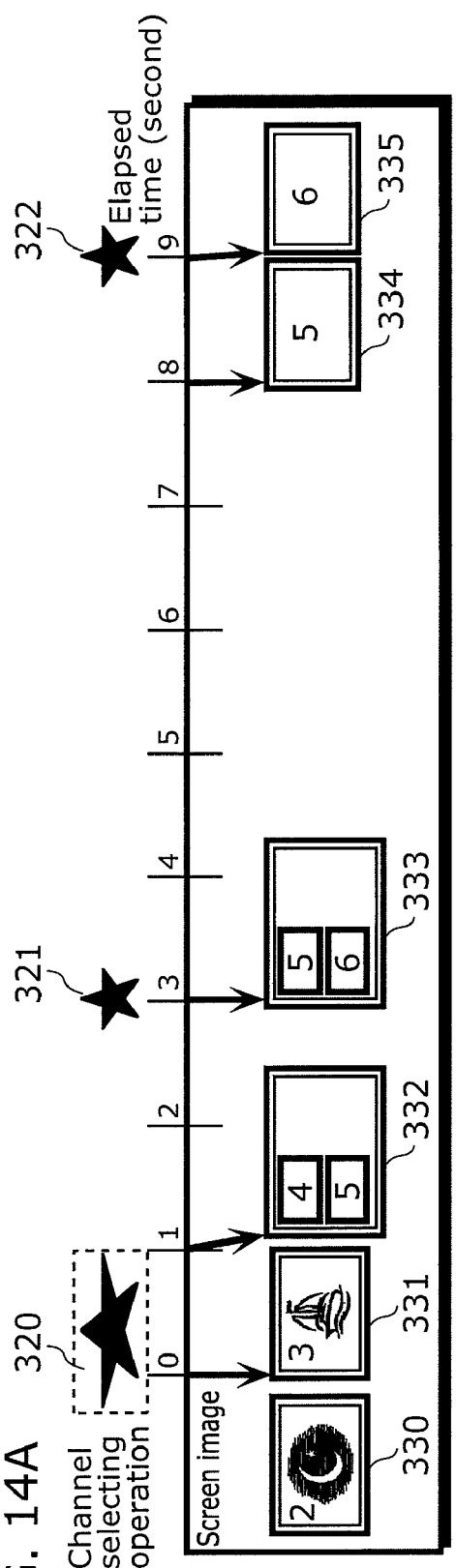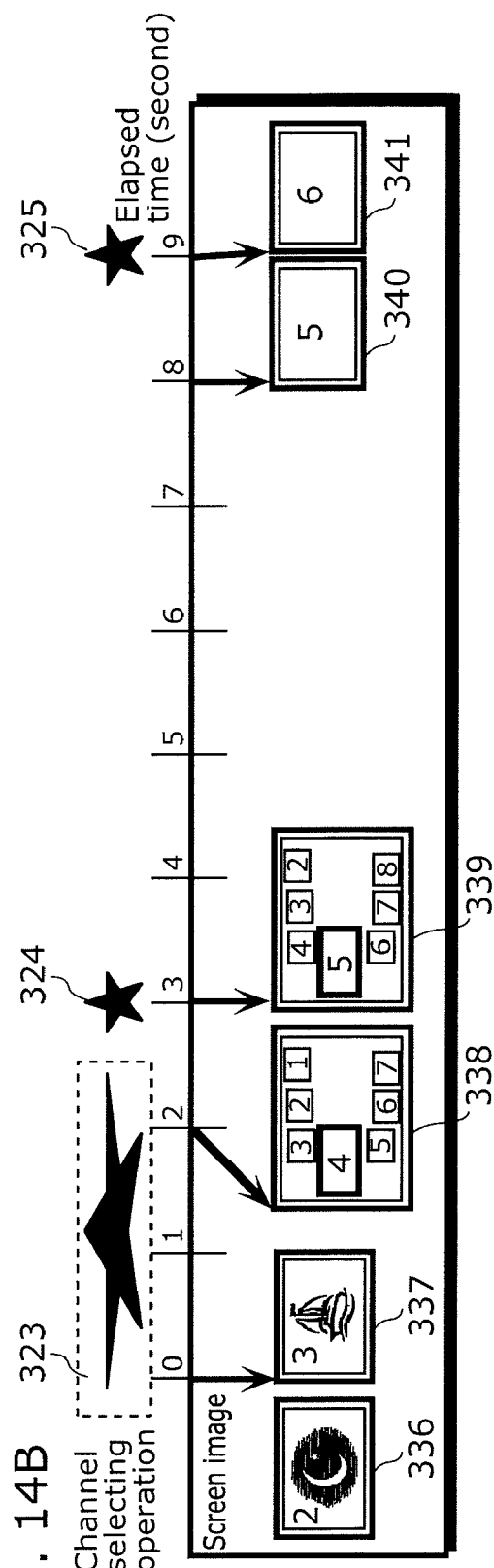

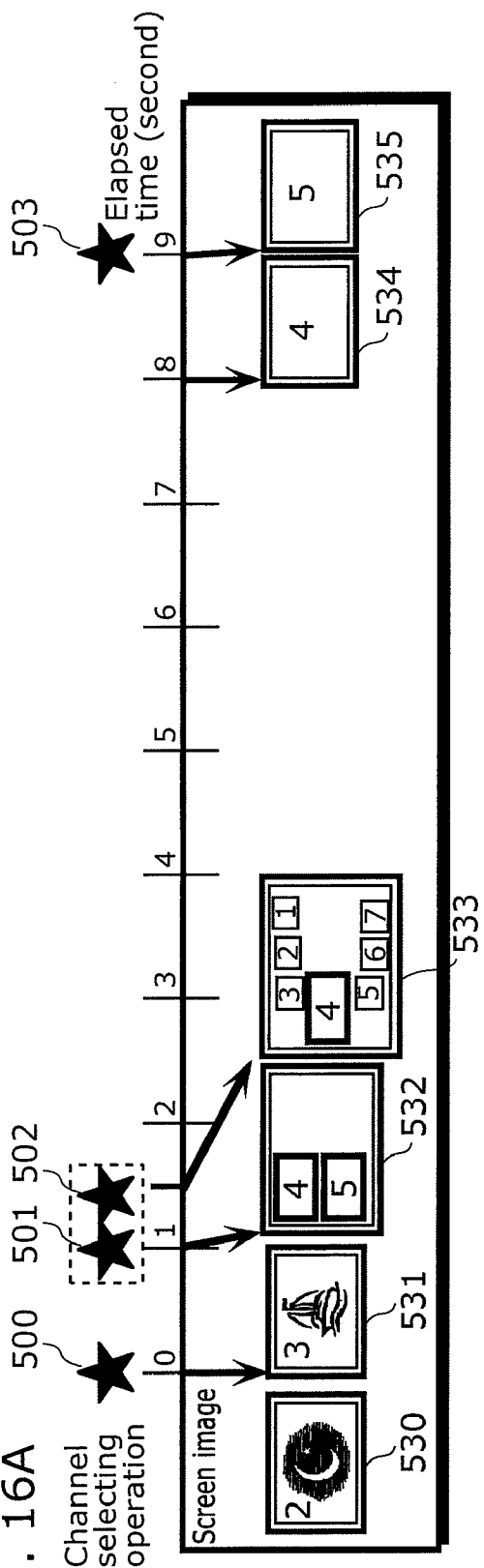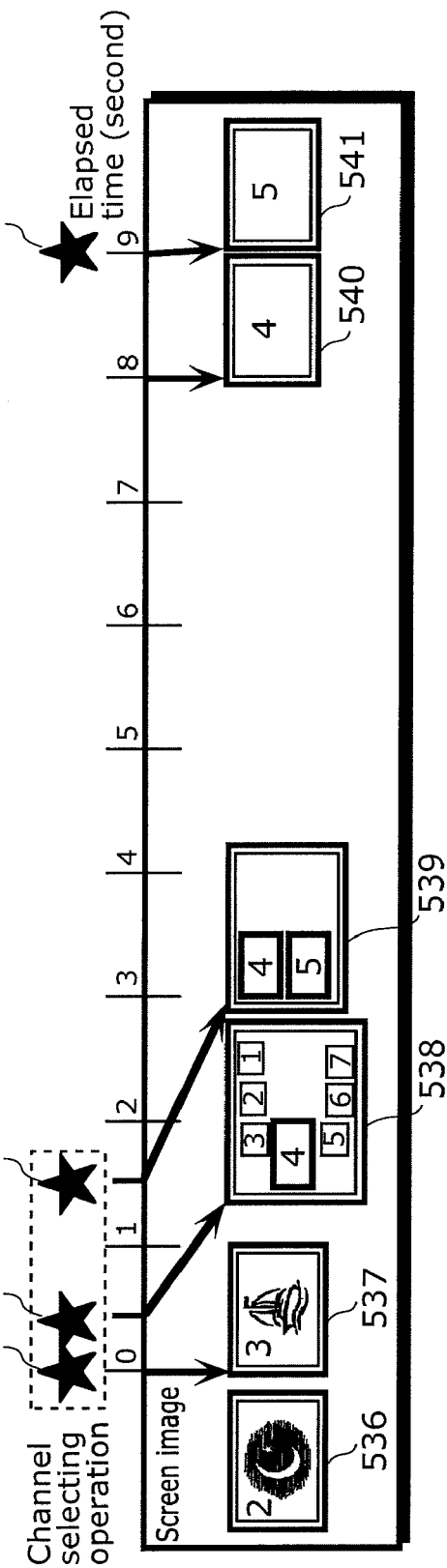

FIG. 19A
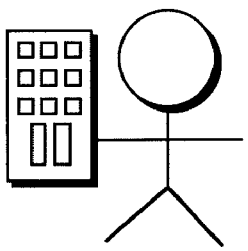
25-year old
FIG. 19B
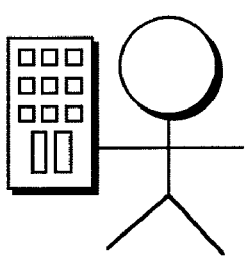
70-year old
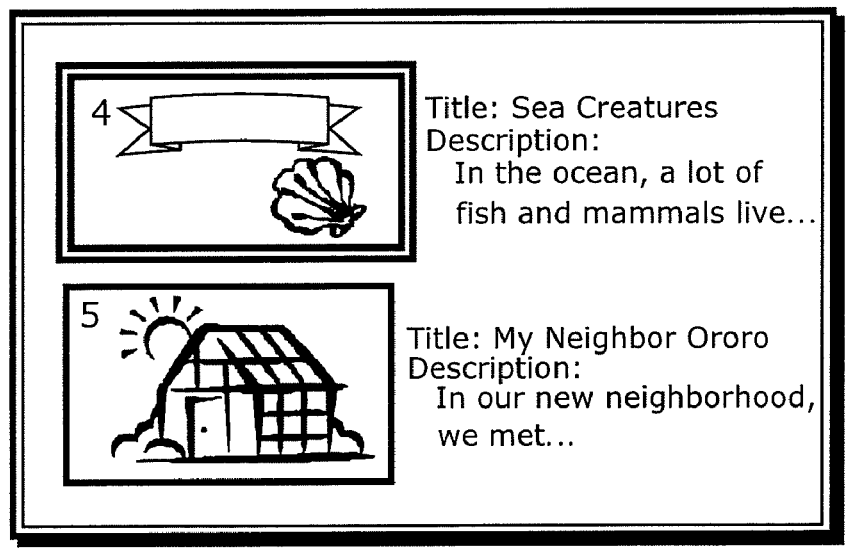

Variety television programs

Variety television programs

FIG. 21
(a)
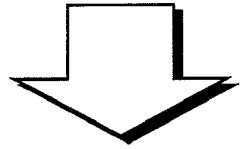
(b)
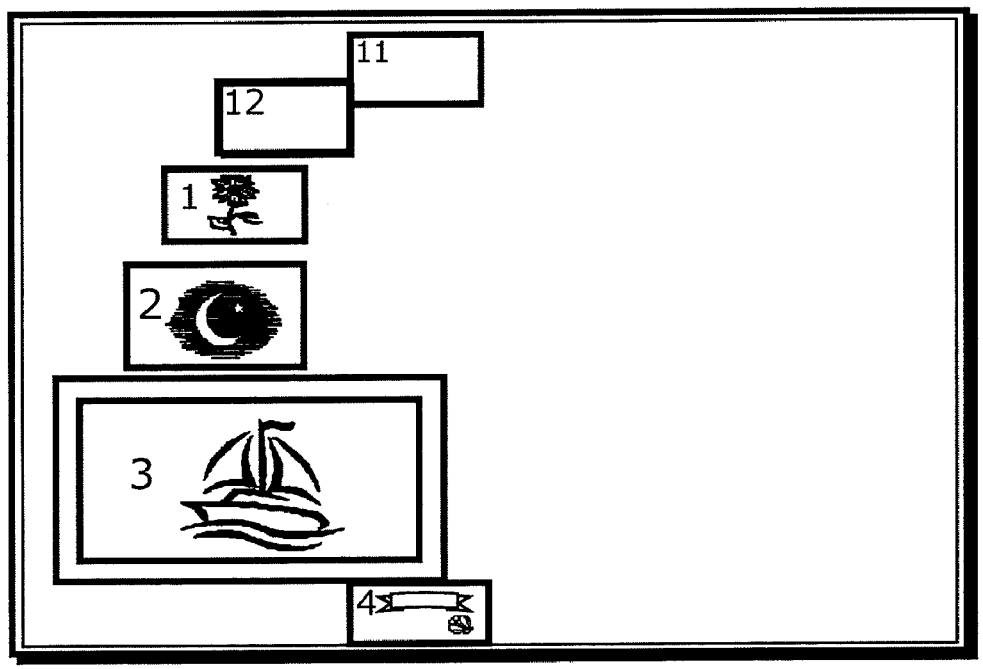

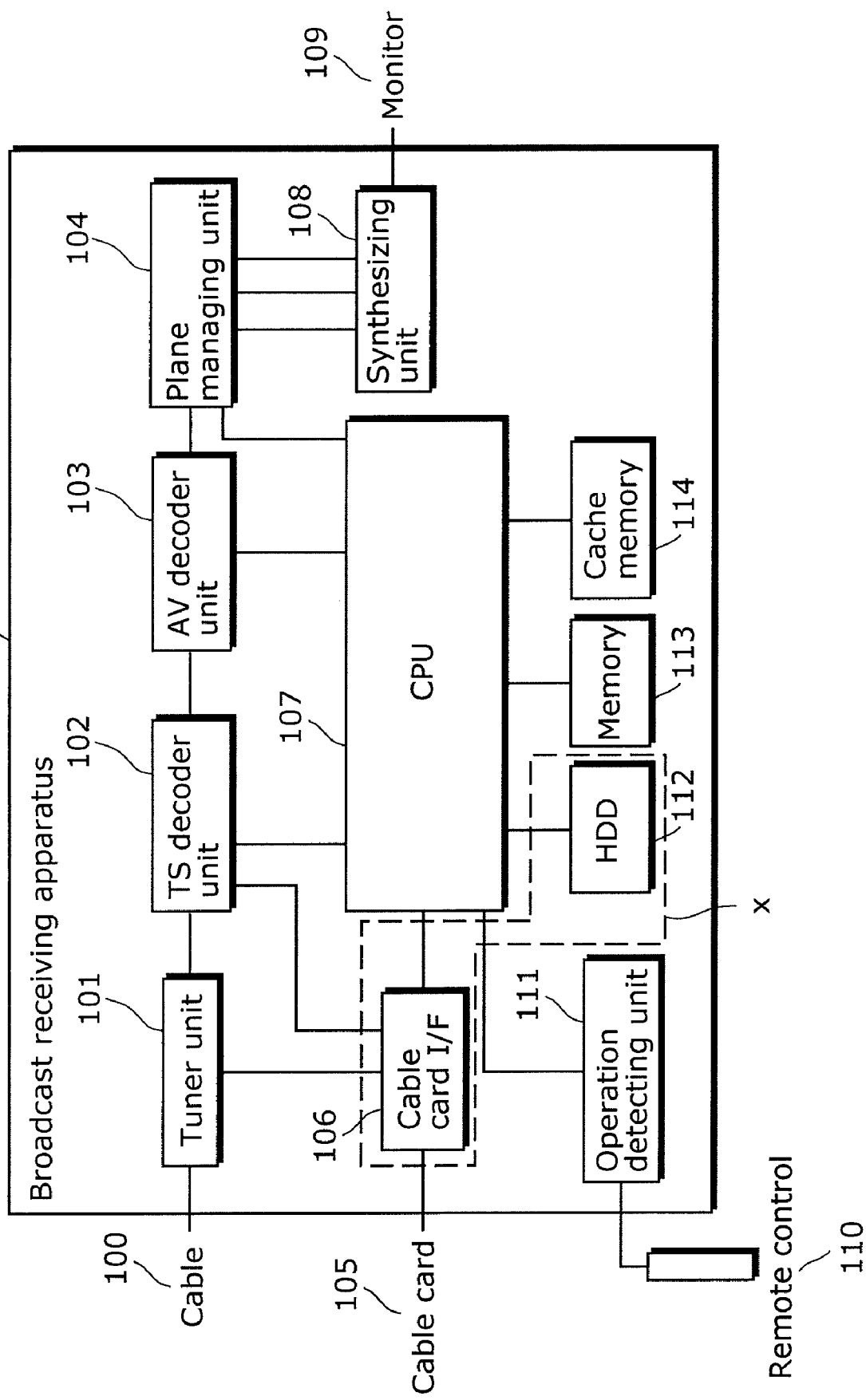

BROADCAST RECEIVING APPARATUS, AND METHOD AND PROGRAM FOR BROADCAST RECEPTION

TECHNICAL FIELD

The present invention relates to a broadcast receiving apparatus that receives analog or digital television broadcasts and, in particular, to a broadcast receiving apparatus that makes quick and reliable selection of a desired television program possible.

BACKGROUND ART

In recent years, television broadcasting has entered a period of changing with transition from analog technology to digital technology. Not only satellite broadcasting such as BS and CS or cable broadcasting but also terrestrial broadcasting has been switching to digital. In the digital broadcasting, data which is associated with television programs is distributed along with audio data and video data compressed in MPEG-2 format, and the number of available channels is not less than a hundred. Accordingly, many television programs can be broadcasted in comparison with conventional analog broadcasting.

A user who is watching television usually selects a desired television program by changing channels one after another (hereinafter referred to as channel-surfing) by pressing a Channel-up or -down key (hereinafter referred to as a channel selecting operation), which is a button to select a channel. A user sometimes performs channel-surfing in order to find a television program that the user has decided to watch, but often in order to view television programs being broadcasted on other channels and decide a television program to watch when the user is not interested in a currently watching television program.

In channel-surfing, intra-coded frames (I frame) necessary for audio and visual presentation are usually distributed only once every 0.5 seconds. Thus, audio and visuals may not be presented instantly because obtaining an I frame or, even when an I frame has been obtained and decoding of audio and video has started, checking restriction, such as parental lock information, set on an apparatus takes some time. Because of this, audio and video of a newly selected channel is presented not immediately after a channel selecting operation but after a black screen. This causes a problem that the user, without knowing what the user's channel selecting operation has caused with a television apparatus, is prevented from selecting a channel quickly for a desired television program through smooth channel selecting operation.

An electronic program guide (hereinafter referred to as an EPG) is known as a technique to solve the problem. Broadcasting stations distribute EPGs to show users details of scheduled television programs sorted by channels and time, thus enabling the users to select desired television programs to watch using the EPGs.

However, in order to launch the EPG, it is necessary to press a key to which the EPG function is assigned. Accordingly, to change channels to select a television program using the EPG is one thing, and changing a currently watching television program to a desired television program without much attention, which is characteristic of channel-surfing, is another.

A broadcast receiving apparatus which provides a method for seeing details of current television programs without pressing a special key is presented that lists details (such as channel numbers, television program titles, still images) of all the current television programs when the apparatus detects start of channel-surfing (see Patent Reference 1, for example).

Patent Reference 1: Japanese Unexamined Patent Application Publication No. 2007-5873

DISCLOSURE OF INVENTION

Problems that Invention is to Solve

Such a conventional broadcast receiving apparatus has a problem that users have difficulty in selecting a desired television program quickly.

Specifically, EPGs present details (such as channel numbers and television program titles) of current television programs along with details of television programs not currently broadcasted on a hundred or more channels available today. This requires users to check the details of each of a lot of television programs to select a desired one. When such details of current television programs on all the channels are listed, display areas for the respective television programs are so small that the users have difficulty in seeing the details of the television programs. Accordingly, users will feel difficulty in selecting a desired television program from the list and probably avoid using the EPG practically.

The present invention, conceived to address the problem, has an object of providing a broadcast receiving apparatus that makes quick selection of a desired television program by channel-surfing possible.

Means to Solve the Problems

In order to address the problem, the broadcast receiving apparatus, which receives a broadcast content and outputs information of the received broadcast content as television program information of a channel for which the broadcast content is received, according to the present invention includes: an operation detecting unit configured to detect a channel selecting operation; an operation speed calculating unit configured to calculate a channel selecting operation speed from the detected channel selecting operation; a list item count determining unit configured to determine, according to the calculated channel selecting operation speed, the number of channels for which the television program information is displayed; a channel determining unit configured to determine channels to be listed so that the television program information is displayed for the determined number of channels; and a displaying unit configured to output the television program information of the determined channels to be listed.

This configuration makes it possible that a list of details of current programs on channels (hereinafter referred to as a thumbnail list) is displayed when a user starts channel-surfing not by pressing a specific key to launch an EPG but by performing a channel selecting operation. This configuration also makes it possible to change the number of channels for which thumbnails are displayed (hereinafter referred to as the number of thumbnails to be listed) according to speed of the channel selecting operation. This enables the user to quickly select a desired television program from a channel list that shows details of as many or few television programs as can be seen by the user with ease even when a large number of channels are available.

Furthermore, the list item count determining unit is preferably configured to determine the number of channels so that the number of channels increases as the calculated channel selecting operation speed becomes faster.

This configuration makes it possible that the number of channels is determined so that the number of channels increases as the calculated channel selecting operation speed becomes faster. This enables the user to quickly select a desired television program by displaying television program information for the determined number of channels.

Furthermore, the operation speed calculating unit may be configured to calculate the channel selecting operation speed so that the calculated channel selecting operation speed becomes faster as a time interval between two successive channel selecting operations detected by the operation detecting unit becomes shorter.

With this configuration, the channel selecting operation speed is calculated from the time interval between the last key operation and a key operation second to the last one after channel-surfing is detected. This enables the user to quickly select a desired television program by displaying television program information for the determined number of channels.

Furthermore, the operation speed calculating unit may be configured to calculate the channel selecting operation speed so that the calculated channel selecting operation speed becomes faster with an increase in a count of the selecting operation detected by the operation detecting unit in a predetermined period of time.

With this configuration, a channel selecting operation speed is calculated from the number of key operations in a certain period of time after channel-surfing is detected. This enables the user to quickly select a desired television program by displaying television program information for the determined number of channels.

Furthermore, the operation detecting unit may be configured to detect a period of time for which a channel selecting operation is performed for a single channel, and the operation speed calculating unit may be configured to calculate the channel selecting operation speed so that the calculated channel selecting operation speed becomes faster as the detected period of time becomes longer.

With this configuration, a channel selecting operation speed is calculated from a press on a key continued for a certain period of time for a channel selecting operation. This enables the user to quickly select a desired television program by displaying television program information for the determined number of channels.

Furthermore, the list item count determining unit may be further configured to determine the number of channels using personal information of a user who performs the channel selecting operation.

This enables the user to quickly select a desired television program by determining, on the basis of personal information of the user which is prerecorded, the number of channels to be listed.

Furthermore, the list item count determining unit may be configured to determine the number of channels so that the number of channels is larger when an age of the user is equal to or above a predetermined first age and is below a second age that is above the first age than when the age of the user is below the first age or is equal to or above the second age.

This configuration makes it possible that the number of channels to be listed is determined, for example, to be larger for a younger user of an age of 20 or above and under 30 than for those of other age groups. This enables the user to quickly select a desired television program from channels of a number optimized for age groups.

Furthermore, the list item count determining unit may be configured to determine, when an age of the user is equal to or above a predetermined third age, the number of channels so that the number of channels decreases as the age of the user increases.

This configuration makes it possible that the number of channels to be listed is determined, for example, to be gradually smaller with an increase in the age of a user when the user is 60-year old or older, so that the user can view displayed television program information with ease. This enables the user to quickly select a desired television program even when a large number of channels are available.

Furthermore, the list item count determining unit may be configured to determine the number of channels based on the time interval between the channel selecting operations by the user or on an actual count of the channel selecting operations by the user in a predetermined period of time so that the number of channels decreases as the time interval becomes shorter or the actual count increases.

This configuration makes it possible that the number of channels to be displayed is determined using a user's personal history of time intervals of channel selecting operations or the number of channel selecting operations recorded by learning control or the like. This enables the user to quickly select a desired television program even when a large number of channels are available.

Furthermore, the channel determining unit may be configured to determine the channels to be listed based on preferences in categories of the broadcast content to be displayed.

This configuration makes it possible that the channels to be listed is determined by setting a preference for a television program category which the user prefers to high so that information of the television program category is displayed. This enables the user to quickly select a desired television program even when a large number of channels are available.

Furthermore, the channel determining unit may be configured to determine, when the preferences are switched, the channels to be listed according to the preferences after the switching.

This configuration makes it possible that the channels to be listed is determined by switching favorite television program categories which the user wants to watch so that the user can have information of television programs that belong to the favorite television program category newly switched to. This enables the user to quickly select a desired television program even when a large number of channels are available.

Furthermore, the displaying unit may be configured to output television program information of the determined channels to be listed so that the television program information of a channel among the determined channels is displayed in a larger size as a preference in a category of the broadcast content on the channel becomes higher.

With this configuration, information of television programs that belong to a user's favorite television program category is displayed in a larger size by setting the preference for the television program category to high. This enables the user to quickly select a desired television program even when a large number of channels are available.

Furthermore, the operation detecting unit may be further configured to detect an operation other than the channel selecting operation, and the list item count determining unit may be configured to determine, when the operation is detected, a value predetermined in association with the operation as the number of channels.

This configuration makes it possible that the user increases and decreases the number of channels to be listed physically by pressing specific buttons. This enables the user to quickly select a desired television program even when a large number of channels are available.

Furthermore, the channel determining unit may be configured to determine the channels to be listed so that television program information of a channel not yet outputted by the displaying unit is outputted instead of television program information of a channel selected from channels outputted by the displaying unit.

This configuration makes it possible to switch television program information of selected and passed channels to television program information of new channels in the order of selection of television program information by moving a cursor when a user selects television program information on the monitor. This will have new channels displayed successively. Thus, this enables the user to quickly select a desired television program even when a large number of channels are available.

Furthermore, the displaying unit may be configured to output television program information so that television program information of a currently selected channel is displayed in a largest size among television program information of currently displayed channels.

With this configuration, when the user makes a selection from displayed television program information, television program information selected using a cursor may be displayed larger in order to enable the user to view details of the television program information easily. This enables the user to quickly select a desired television program even when a large number of channels are available.

Furthermore, the displaying unit may be configured to output television program information so that television program information of a channel is displayed in a larger size as the television program information of the channel becomes closer to television program information of the currently selected channel.

With this configuration, when the user makes a selection from displayed television program information, television program information selected using a cursor is displayed in a larger size in order to enable the user to view details of the television program information easily. This enables the user to quickly select a desired television program even when a large number of channels are available.

Furthermore, the present invention may be embodied not only as such a broadcast receiving apparatus but also as an integrated circuit having the processing units which compose the apparatus and controlling the broadcast receiving apparatus, and also as a method including the processes executed by the processing units. It is also possible to embody the present invention as a program that causes a computer to execute the processes, as a computer medium, such as a computer-readable CD-ROM, on which the program is recorded, and as information, data, or a signal that represents the program. The program, the information, the data, and the signal may be distributed via a communication network, such as the Internet.

Effects of the Invention

As described above, the present invention has an advantageous effect that users can quickly select their desired television programs from as many or few listed channels as the users can easily see details of television programs.

BRIEF DESCRIPTION OF DRAWINGS

FIG. 9 shows screen images of a thumbnail list according to the first embodiment of the present invention in the case where all the thumbnails in a list have the same size.

FIG. 12A shows points of time at which a user performs channel selecting operations and screen images at those points of time on the basis of the number of operations in a certain period of time according to the second embodiment of the present invention.

FIG. 12B shows points of time at which a user performs channel selecting operations and screen images at those points of time on the basis of the number of operations in a certain period of time according to the second embodiment of the present invention.

FIG. 14A shows points of time at which a user performs channel selecting operations and screen images at those points of time on the basis of a press for a certain period of time according to the third embodiment of the present invention.

FIG. 14B shows points of time at which a user performs channel selecting operations and screen images at those points of time on the basis of a press for a certain period of time according to the third embodiment of the present invention.

FIG. 16A shows points of time at which a user performs channel selecting operations screen images at those points of time on the basis of differences between speeds of operations for selecting a channel according to the fourth embodiment of the present invention.

FIG. 16B shows points of time at which a user performs channel selecting operations screen images at those points of time on the basis of differences between speeds of operations for selecting a channel according to the fourth embodiment of the present invention.

FIG. 19A shows a function of the broadcast receiving apparatus according to the first variation.

FIG. 19B shows a function of the broadcast receiving apparatus according to the first variation.

FIG. 21 shows a function of the broadcast receiving apparatus according to the third variation.

FIG. 24 shows an example of the broadcast receiving apparatus made using an integrated circuit.

NUMERICAL REFERENCES

Figure 1:
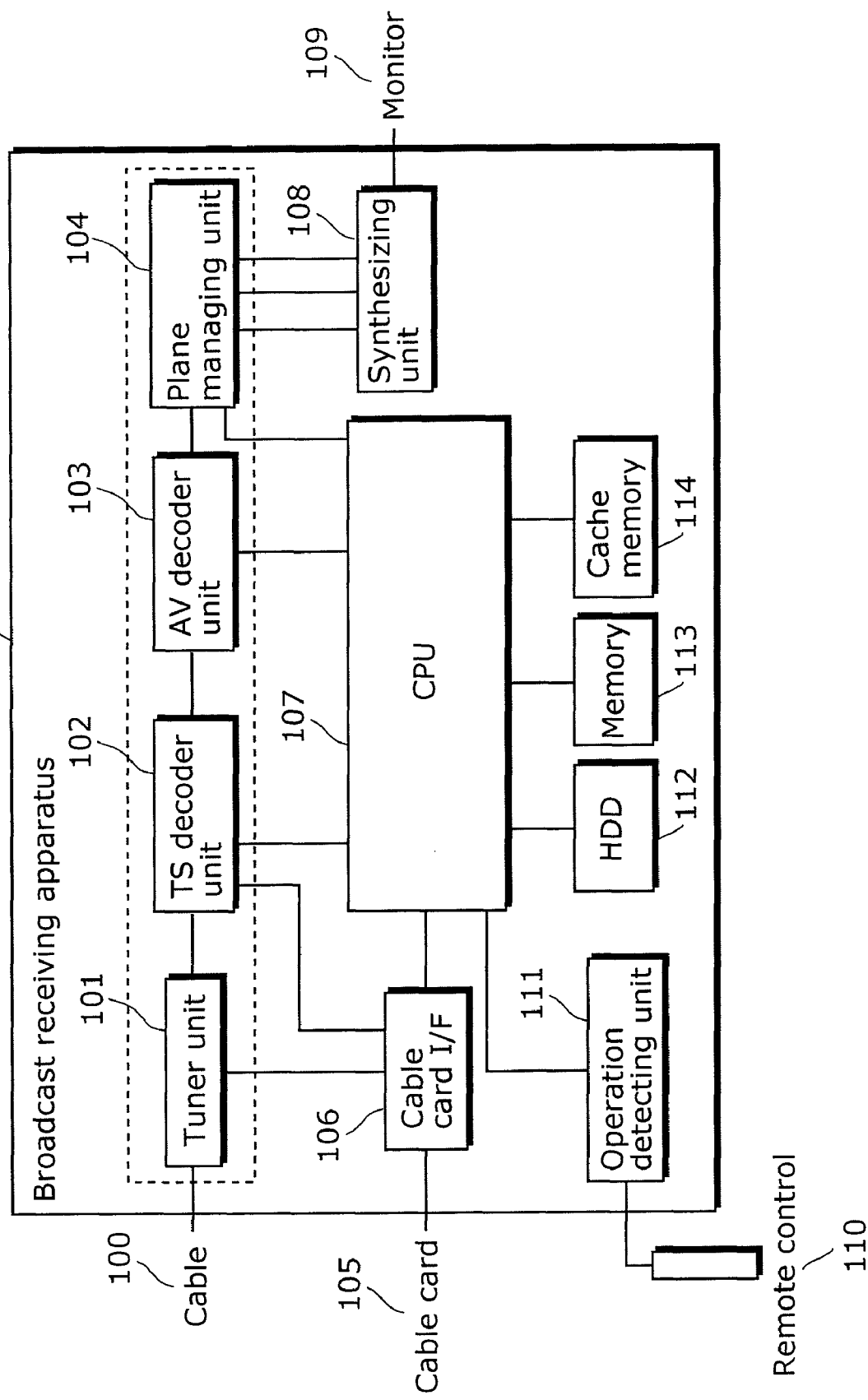
FIG. 1 shows a configuration of hardware of a broadcast receiving apparatus according to the first to the fourth embodiments of the present invention.

10 Broadcast receiving apparatus
100 Cable
101 Tuner unit
102 TS decoder unit
103 AV decoder unit
104 Plane managing unit
105 Cable card
106 Cable card interface (I/F)
107 CPU
108 Synthesizing unit
109 Monitor
110 Remote control
111 Operation detecting unit
112 HDD
113 Memory
114 Cache memory
204 Still image
205 Television program data
206 Channel number
207 Display position
208 Channel information memory unit
209 Channel selecting operation time memory unit
211 Operation speed calculating unit
212 List item count determining unit
213 Channel determining unit
214 Television program information generating unit
215 Display position determining unit
216 Displaying unit

BEST MODE FOR CARRYING OUT THE INVENTION

Hereinafter, embodiments of the present invention are described with reference to figures.

(First Embodiment)

To begin with, the first embodiment of the present invention is described.

FIG. 1 shows a configuration of hardware of a broadcast receiving apparatus according to the first embodiment of the present invention.

A broadcast receiving apparatus 10 receives a broadcast content, which is a digital copyrighted work, and outputs information of the received broadcast content as television program information of a channel for which the broadcast content is received, and displays the broadcast content on a monitor.

As shown in FIG. 1, the broadcast receiving apparatus 10 includes a tuner unit 101, a TS decoder unit 102, an AV decoder unit 103, a plane managing unit 104, a cable card interface (I/F) 106, a CPU 107, a synthesizing unit 108, an operation detecting unit 111, a hard disk drive (HDD) 112, a memory 113, and a cache memory 114.

The cable card interface 106 is a part through which a cable card 105 and the broadcast receiving apparatus 10 mutually exchange data. Specifically, a cable card 105 is inserted into the broadcast receiving apparatus 10 so that the broadcast receiving apparatus 10 can receive a transport stream (hereinafter referred to as a TS), which has at least one set of audio data, video data, and data associated with a television program, transmitted from a cable broadcasting station. Here, the cable card 105 is a card that makes it possible to receive a broadcast content from specific broadcasting stations. The broadcast receiving apparatus 10 exchanges data with the cable card 105 through the cable card interface 106.

The operation detecting unit 111 is a part that receives a signal from a remote control 110 and detects operations such as a channel selecting operation. Specifically, the broadcast receiving apparatus 10 receives information of user operations (hereinafter referred to as a key code), through the remote control 110, using the operation detecting unit 111, and executes processes according to the operations.

The tuner unit 101, the TS decoder unit 102, and the AV decoder 103 are parts that playback the TS which the broadcast receiving apparatus 10 receives. The tuner unit 101 receives a digital signal distributed from a broadcasting station through a cable 100 and demodulates the digital signal. The TS decoder unit 102 filters a TS which has multiplexed audio data, video data, and data associated with a television program. The AV decoder 103 demodulates audio data and video data distributed from a broadcasting station in a format such as MPEG. In FIG. 1, the tuner unit 101, the TS decoder unit 102, the AV decoder unit 103, and the plane managing unit 104 are collectively called as a decoder.

The CPU 107 is a controller that controls the broadcast receiving apparatus 10. The CPU 107 is connected with the HDD 112, which is a storage unit, the memory 113, which is a volatile storage unit, and the cache memory 114, which is a non-volatile storage unit.

The plane managing unit 104 holds planes to be displayed on a monitor 109. The planes include a plane for displaying an image, a plane for an application of the broadcast receiving apparatus 10, and a plane for external input.

The synthesizing unit 108 synthesizes the planes to be held in the plane managing unit 104. The synthesized planes are outputted to the monitor 109. The monitor 109 processes images outputted from the synthesizing unit 108 and shows them.

A configuration of a digital broadcasting system according to an embodiment of the present invention is described below.

First, a general structure of an MPEG2-TS transmitted from a broadcasting station is described.

Figure 2:
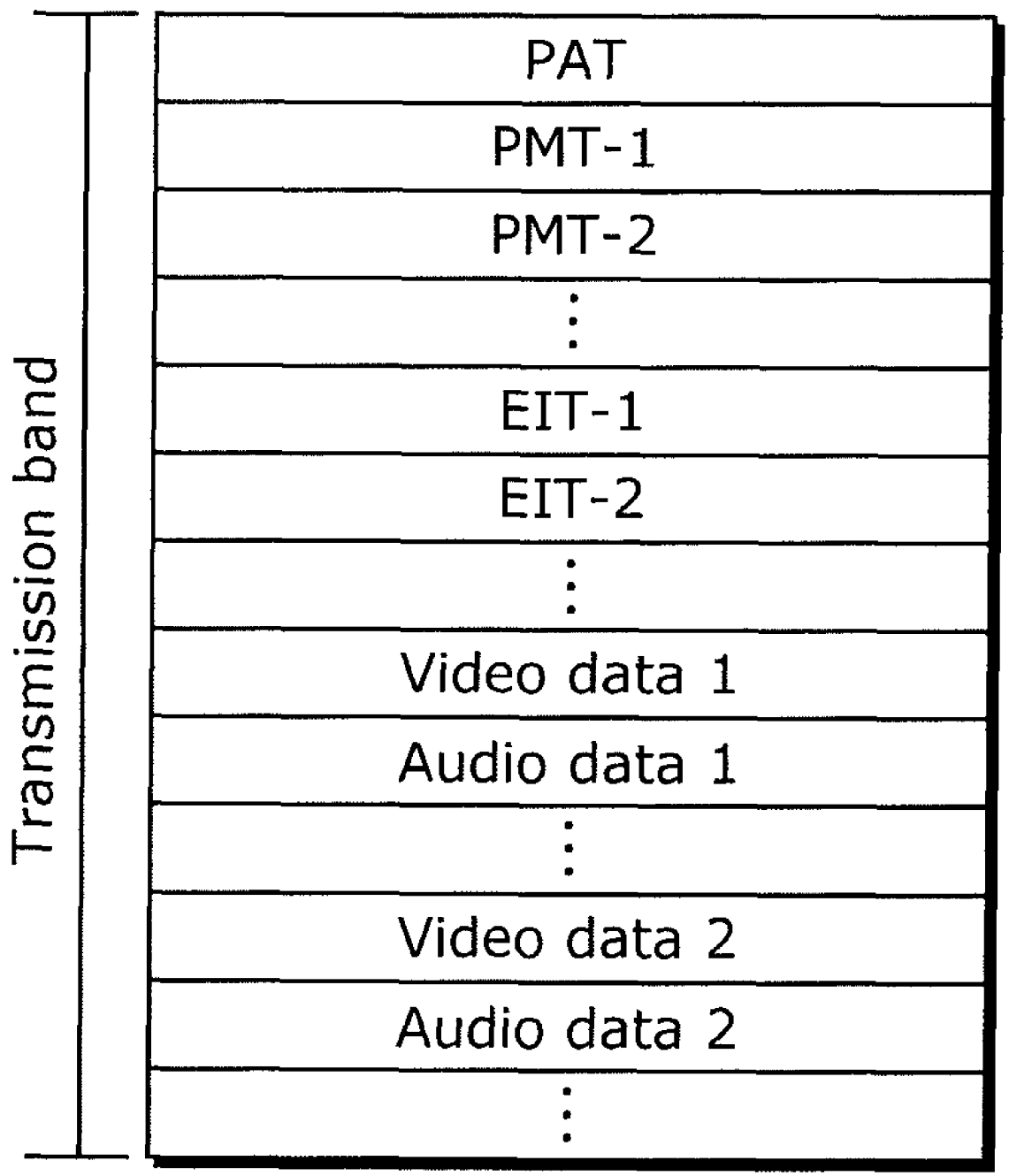
FIG. 2 is a schematic view of an MPEG2-TS transmitted from a broadcasting station according to the first to the fourth embodiments of the present invention.

FIG. 2 is a schematic view of an MPEG2-TS transmitted from a broadcasting station according to the first embodiment of the present invention. The present schematic view is identical to a schematic view of the MPEG2-TS in accordance with the Digital Video Broadcasting (DVB) standard. A broadcasting station transmits an MPEG2-TS having at least one set of audio data, video data, and data associated with a television program. As shown in FIG. 2, an MPEG2-TS includes data of a channel, such as video data, audio data, and TS control data. The TS data includes a Program Association Table (PAT), a Program Map Table, and an Event Information Table.

Figure 3B:
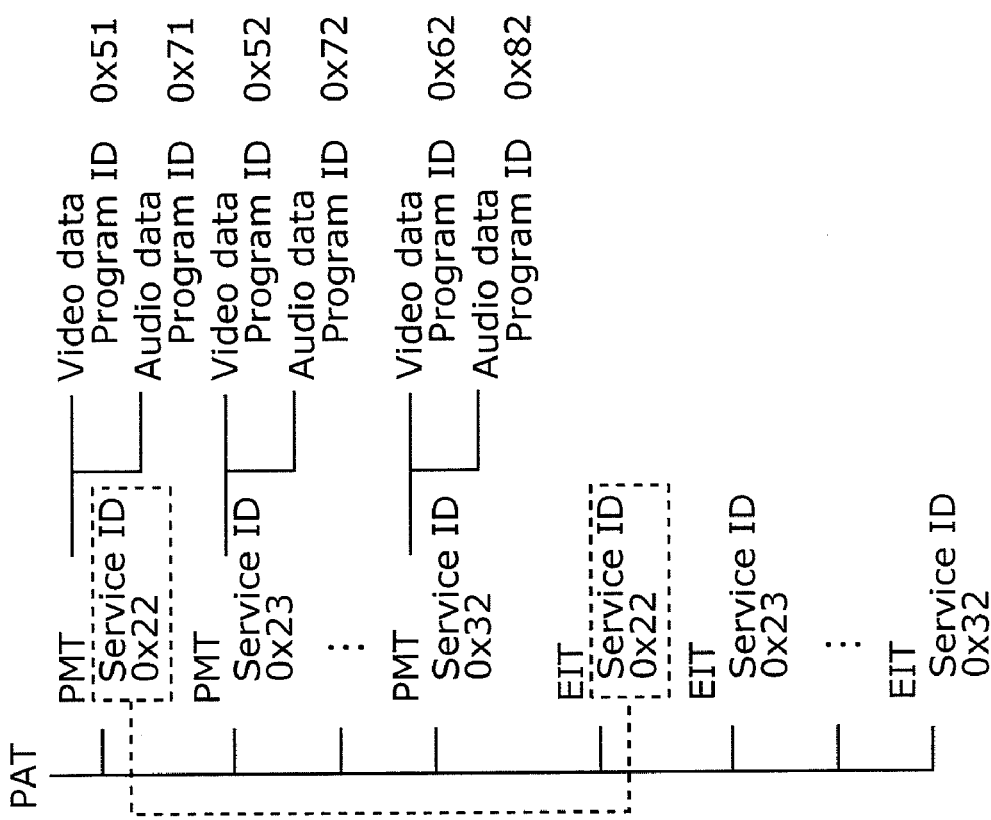
FIG. 3B shows a configuration of the MPEG2-TS according to the first to the fourth embodiments.
Figure 3A:
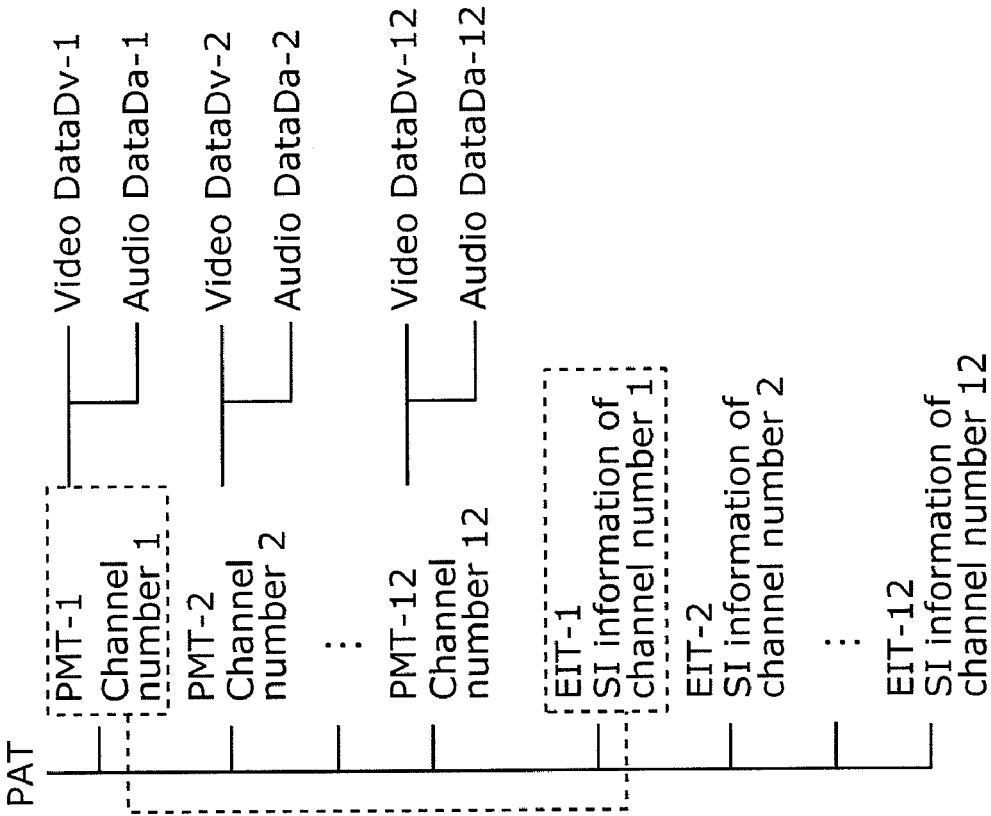
FIG. 3A shows a general configuration of an MPEG2-TS.

FIG. 3A shows a general configuration of an MPEG2-TS. The PAT includes service IDs of PMTs and holds a list of channels included in a TS. The channels are identified with the service IDs of the PMTs. Each of the PMTs includes information relevant to a channel and program IDs of audio and video contained in the channel. The audio data and video data are obtained by extracting audio data and video data having the program IDs from the TS. The EITs have the same service IDs as the service IDs of the PMTs so that the EITs are associated with the PMTs as television program information (hereinafter referred to as SI information) of the channel represented by the PMTs.

Figure 4:
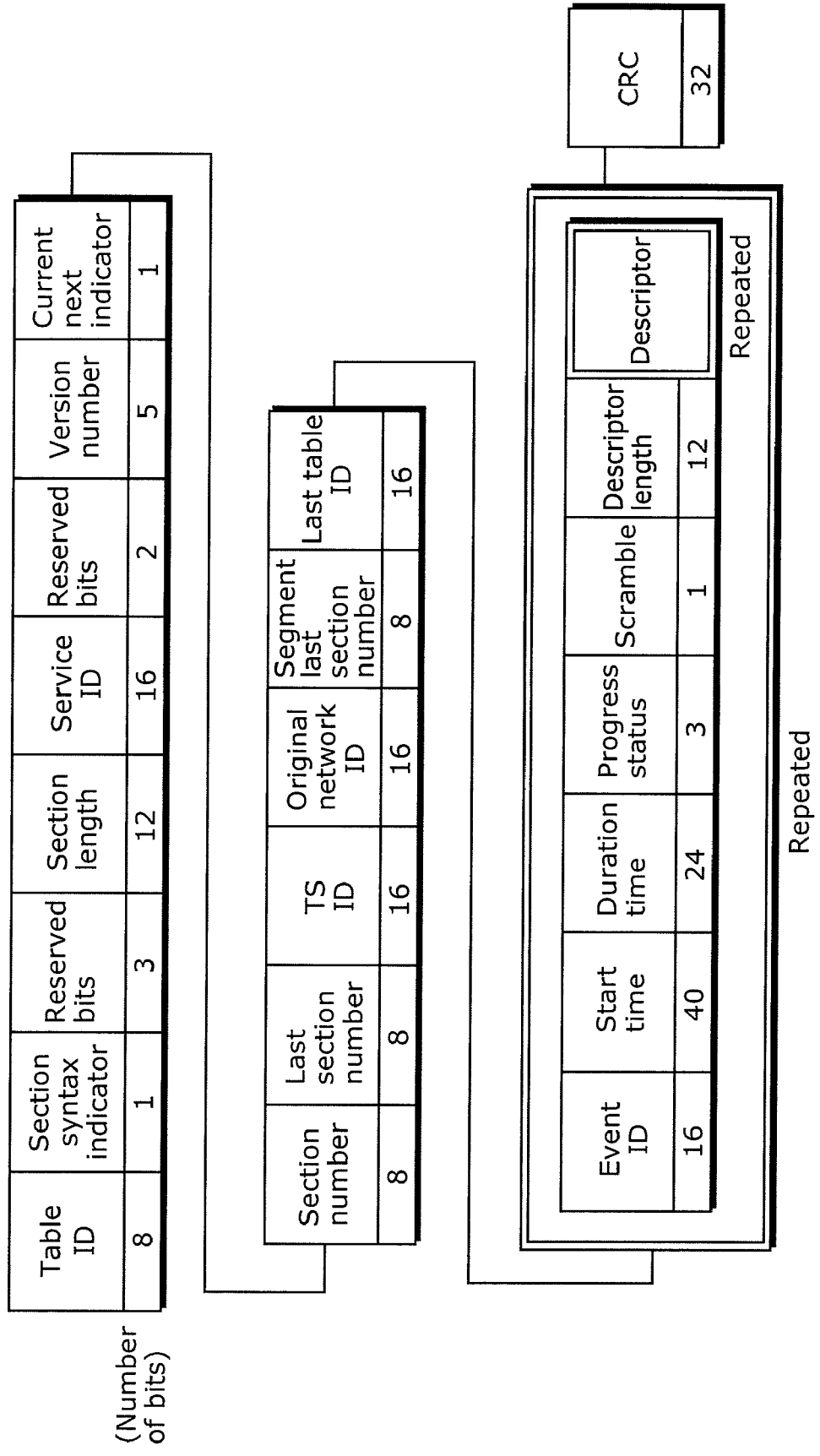
FIG. 4 shows a data structure of the EITs according to the first to the fourth embodiments of the present invention.

FIG. 4 shows a data structure of the EITs according to the first embodiment of the present invention. As shown in FIG. 4, one EIT is composed of an event ID that identifies a television program and information that specifies the television program, such as starting time and duration time of the television program. A descriptor contains a title and a summary of the television program.

Structures of PATs, PMTs, and EITs and methods for obtaining them are well known to those skilled in the art.

A structure of an MPEG2-TS to be used in the first embodiment is described below.

FIG. 3B shows a configuration of the MPEG2-TS to be used in the first embodiment. In the first embodiment, one TS that contains a PAT, PMTs, EITs, and audio data and video data is used.

The TS contains 12 PMTs having one of service IDs PMT-1 to PMT-12 that are unique to each of the PMTs and used for identification. These PMTs are assumed to correspond to a channel number 1 to a channel number 12, respectively. The PMT-1 designates a program ID of video DataDv-1 and audio DataDa-1 as a constituent of the channel number 1, as is the constituents of the PMT-2 to the PMT-12. The EITs, which are associated with the PMTs by sharing the service IDs with the PMTs, are identified as EIT-1 to EIT-12 and assumed to be SI information of the channel number 1 to the channel number 12, respectively.

In the first embodiment, one TS includes all the channels. It is well known to those skilled in the art that a plurality of TSs is broadcasted. Channels may be selected from across the TSs Although the channels are identified with the service IDs of the PMTs, other tables available for channel identification, such as a Network Information Table (NIT) according to the DVB standard, may be used instead. Although the SI information is obtained from the EITs, other tables from which details such as titles or summaries of television programs are available may be used instead.

Figure 5:
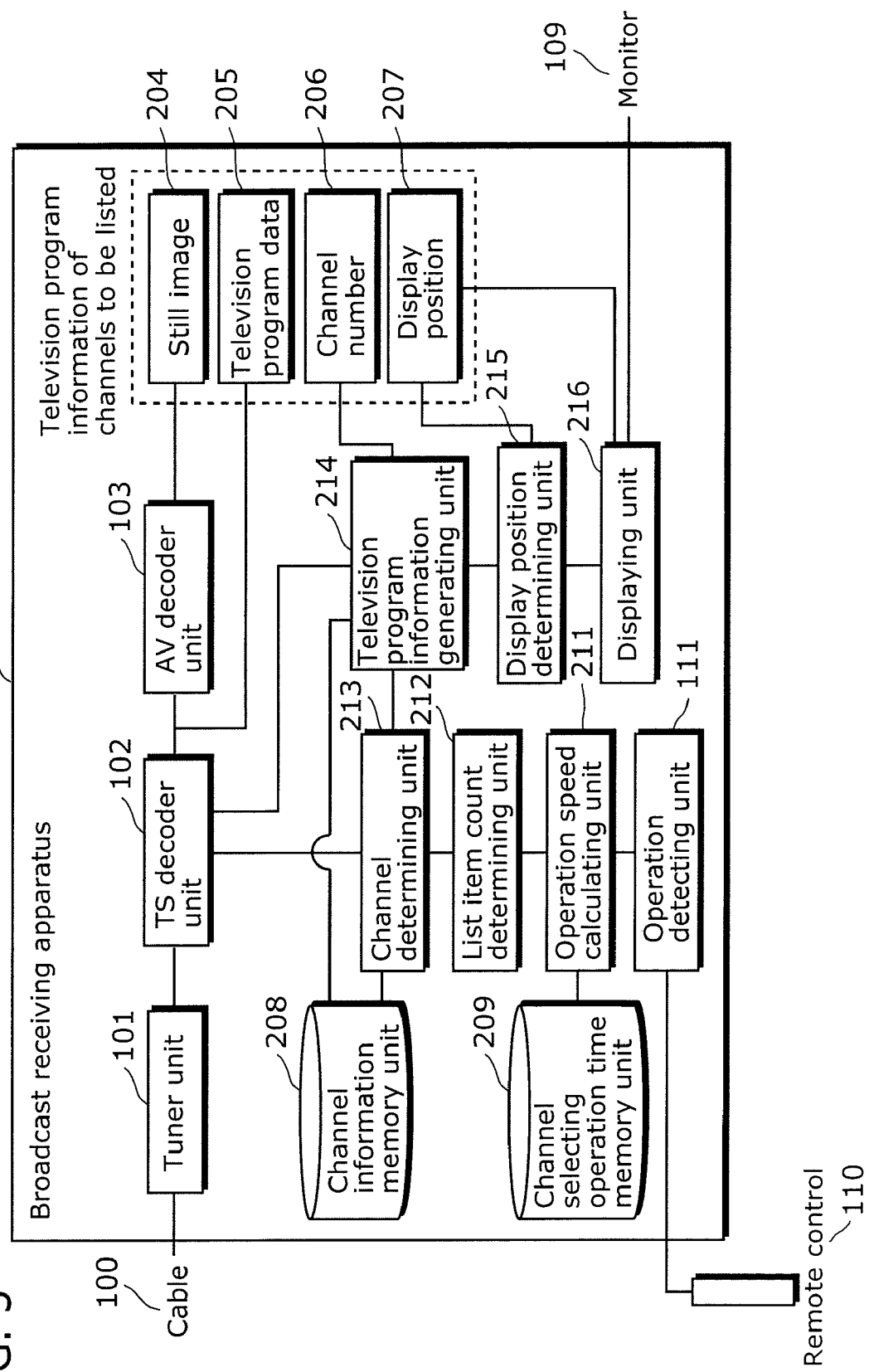
FIG. 5 is a functional block diagram showing an example of the broadcast receiving apparatus according to the first to the fourth embodiments of the present invention.

FIG. 5 is a functional block diagram showing an example of the broadcast receiving apparatus 10 according to the first embodiment of the present invention.

As shown in FIG. 5, the broadcast receiving apparatus 10 is implemented with an operation speed calculating unit 211, a list item count determining unit 212, a channel determining unit 213, a program information generating unit 214, a display position determining unit 215, and a display unit 216 that are executed as a predetermined program. The broadcast receiving apparatus 10 includes a channel selecting operation time memory unit 209 and a channel information memory unit 208 where data is stored. The tuner unit 101, the TS decoder unit 102, the AV decoder unit 103, and the operation detecting unit 111 have the same functions as shown with reference to FIG. 1, thus a description thereof is omitted.

The channel selecting operation time memory unit 209 stores time at which the last channel selecting operation was performed. The channel information memory unit 208 stores a channel number that a user is currently watching.

The operation speed calculating unit 211 calculates a channel selecting operation speed from channel selecting operations detected by the operation detecting unit 111. Specifically, the operation speed calculating unit 211 calculates a channel selecting operation speed by comparing the time of a current channel selecting operation and the time of the last channel selection stored in the channel selecting operation time memory unit 209. A channel selecting operation speed calculated by the operation speed calculating unit 211 becomes faster as a time interval between two successive channel selecting operations detected by the operation detecting unit 111 becomes shorter. Then, the operation speed calculating unit 211 stores the time at which the current channel selecting operation was performed in the channel selecting operation time memory unit 209.

The list item count determining unit 212 determines, on the basis of the channel selecting operation speed calculated by the operation speed calculating unit 211, the number of thumbnails to be listed, which is the number of channels for which television program information is displayed. Specifically, the number of thumbnails to be listed, which is determined by the list item count determining unit 212, increases as the channel selecting operation speed calculated by the operation speed calculating unit 211 becomes faster.

The channel determining unit 213 determines channels to be listed so that the television program information is displayed for the number of thumbnails to be listed which is determined by the list item count determining unit 212. Specifically, the channel determining unit 213 determines one or more channels for which thumbnails are displayed. Such channels are determined on the basis of the number of thumbnails to be listed determined by the list item count determining unit 212, key codes inputted via the operation detecting unit 111, and the channel numbers stored in the channel information memory unit 208.

The television program information generating unit 214 generates, on the basis of numbers of the channels determined by the channel determining unit 213, still images 204, television program data 205, and channel numbers 206, which compose television program information of the channels to be listed. The still images 204 are generated by obtaining video data from a PMT that corresponds to one of the channel numbers and stopping the video data at a desired playing time during AV decoding. Obtained as the television program data 205 is television program information (such as television program titles and summaries) that makes it possible to identify television programs with service IDs identical to service IDs of the PMT. The channel numbers 206 are the numbers of the channels to be listed.

The display position determining unit 215 determines a display position of the television program information of the channels to be listed according to the channel numbers stored in the channel information memory unit 208 and the number of thumbnails to be listed determined by the list item count determining unit 212. The display positions determined by the display position determining unit 215 are held in a display position 207 as one item of the television program information of the channels to be listed.

The displaying unit 216 outputs the television program information of the channels to be listed determined by the channel determining unit 213. Specifically, the displaying unit 216 outputs the television program information of the channel to be displayed to the monitor 109 to display thumbnails.

In the first embodiment of the present invention, the broadcast receiving apparatus 10 receives, from a broadcasting station, a TS that contains audio data, video data, and data associated with a television program, calculates the number of thumbnails to be listed according to speed of the channel selecting operation of a channel-surfing user, and lists thumbnails on the monitor 109. When another channel selecting operation is performed, the broadcast receiving apparatus 10 changes channels for which thumbnails are displayed while keeping the number of thumbnails to be listed, generates new television program information, and updates thumbnails to be listed. The broadcast receiving apparatus 10 according to the first embodiment is described below.

First, an example of images of operations by a user is described with reference to FIG. 6A and FIG. 6B.

Figure 6A:
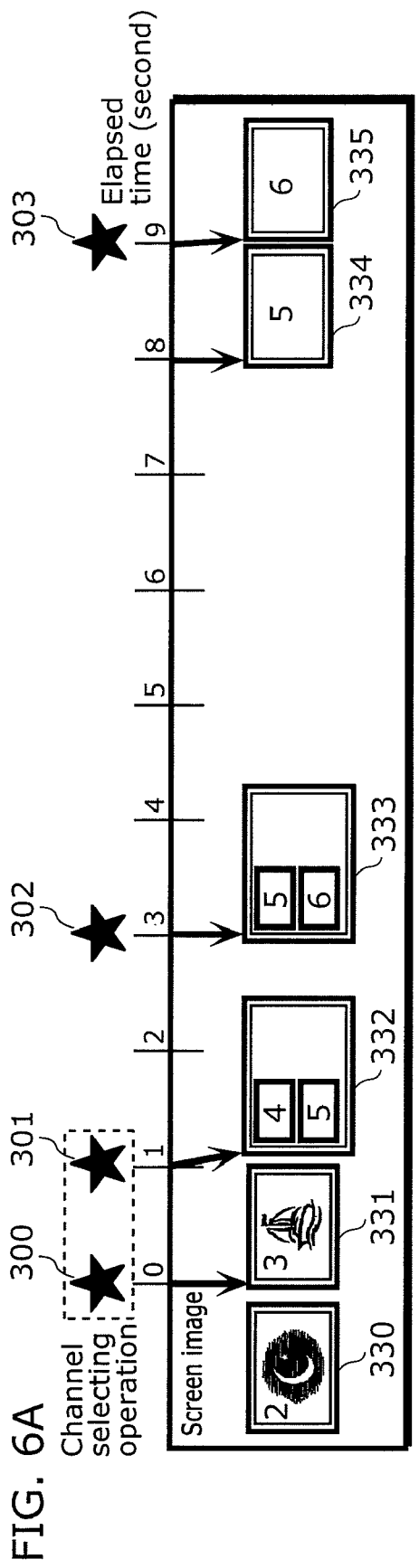
FIG. 6A shows points of time at which a user performs channel selecting operations and screen images at those points of time on the basis of differences between speeds of the channel selecting operations according to the first embodiment of the present invention.
Figure 6B:
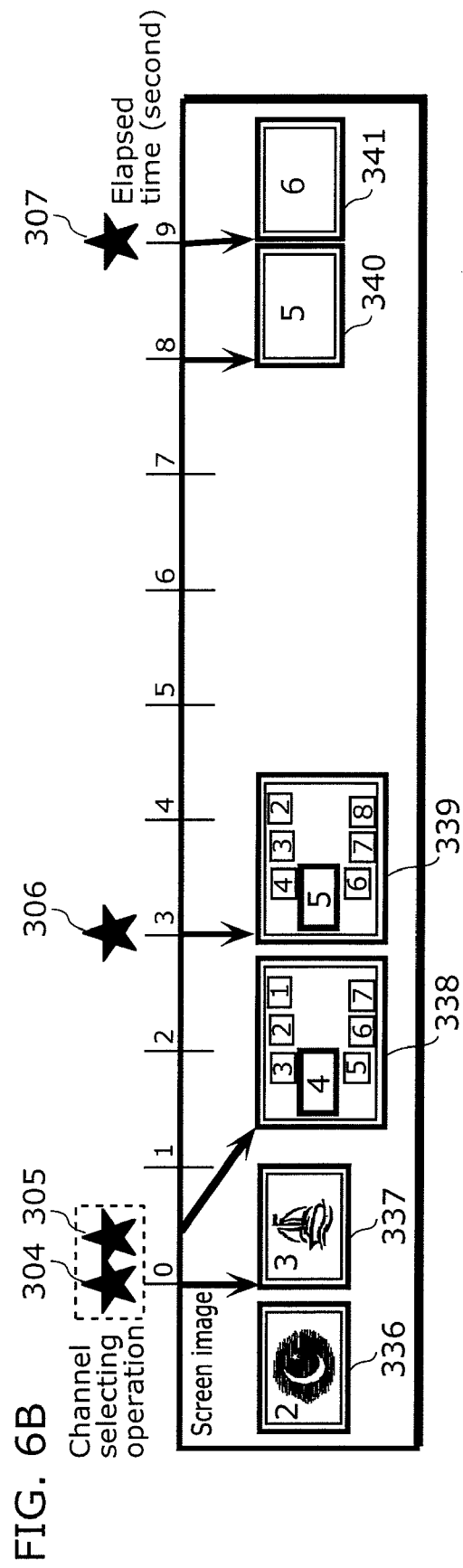
FIG. 6B shows points of time at which a user performs channel selecting operations and screen images at those points of time on the basis of differences between speeds of the channel selecting operations according to the first embodiment of the present invention.

FIG. 6A and FIG. 6B show points of time at which a user performs channel selecting operations and screen images at those points of time on the basis of differences between speeds of the channel selecting operations according to the first embodiment of the present invention.

Specifically, these figures show (i) points of time at which a user performs channel selecting operations successively by pressing a Channel-up key to select a channel and (ii) screen images at those points of time in the case where broadcasting stations broadcast television programs on twelve channels (channel numbers 1 to 12), as shown in FIG. 3B, and the user is watching the channel 2 (a television program on the channel with the channel number 2).

FIG. 6A shows points of time of presses on the key for selecting a channel and screen images at those points of time in the case where channel selecting operation speed is slow.

As shown in FIG. 6A, when the user is watching the channel 2 (screen 330), the user gives a press 300 to the Channel-up key of the remote control 110 to have the channel 3 (screen 331) displayed in order to see what television program is currently broadcasted on another channel.

In the case where the user gives the Channel-up key a press 301 within 2 seconds of the press 300 on the Channel-up key, the broadcast receiving apparatus 10 determines that channel-surfing is started, and then transitions to a thumbnail list.

Specifically, the operation detecting unit 111 detects the press 300 and the press 301, which are channel selecting operations, given to the Channel-up key. The operation speed calculating unit 211 calculates a channel selecting operation speed from the presses 300 and 301 on the Channel-up key. Here, it is assumed that the press 301 on the Channel-up key occurred after 1 second of the press 300. Consequently, the operation speed calculating unit 211 obtains a channel selecting operation speed of 1 second per press.

The number of thumbnails to be listed, which is determined by the list item count determining unit 212, increases as the channel selecting operation speed calculated by the operation speed calculating unit 211 becomes faster. More specifically, when channel selecting operation speed is equal to or faster than 0.5 seconds per press, the list item count determining unit 212 determines that the channel selecting operation speed is fast and sets the number of thumbnails to be listed to seven. When channel selecting operation speed is slower than 0.5 seconds per press, the list item count determining unit 212 determines that the channel selecting operation speed is slow and sets the number of thumbnails to be listed to two.

In this case, the list item count determining unit 212 determines that the channel selecting operation speed for channel-surfing is slow and that the number of thumbnails to be listed is set to two.

Next, the channel determining unit 213 determines channels to be listed so that the television program information is displayed for the number of thumbnails to be listed which is determined by the list item count determining unit 212. In this case, the channel determining unit 213 determines two channels that have channel numbers subsequent to that of the current channel as channels to be listed.

Following this, the television program information generating unit 214 generates television program information of the two channels determined by the channel determining unit 213, and the display position determining unit 215 determines display positions of the television program information on the monitor 109. The displaying unit 216 outputs the television program information of the two channels determined by the channel determining unit 213 to display the television program information on the monitor 109 (screen 332).

In the case where the Channel-up key 302 is pressed during the thumbnails are displayed on the monitor 109, the channel determining unit 213 changes channel numbers for which thumbnails are listed while the list item count determining unit 212 keeps the number of thumbnails to be listed. The television program information generating unit 214 then generates new television program information of the channels for which thumbnails are listed, and outputs the television program information so that the displaying unit 216 updates the thumbnail list to be listed on the monitor 109 (screen 333)

In the case where the monitor 109 displays the thumbnails and the user does not perform another channel selecting operation within five seconds of the last channel selecting operation, the broadcast receiving apparatus 10 selects a channel currently selected using a cursor and displays the channel in full screen (screen 334).

As in the case of the press 300, the next channel 6 (screen 335) is displayed in the case where a press 303 is given to the Channel-up key when the channel is displayed in full screen (screen 334).

FIG. 6B shows points of time of presses on the key for selecting a channel and screen images at those points of time in the case where channel selecting operation speed is fast.

As shown in FIG. 6B, when the user is watching the channel 2 (screen 330), the user gives a press 304 to the Channel-up key of the remote control 110 to have the channel 3 (screen 337) displayed in order to see what television program is currently broadcasted on another channel.

When the operation detecting unit 111 detects a press 305 on the Channel-up key after 0.5 seconds of a press 304, the operation speed calculating unit 211 obtains a channel selecting operation speed of 0.5 seconds per press.

In this case, the list item count determining unit 212 determines that the channel selecting operation speed for channel-surfing is fast and sets the number of thumbnails to be listed to seven. The channel determining unit 213 determines seven channels that have channel numbers subsequent to that of the current channel as channels to be listed. Following this, the television program information generating unit 214 generates television program information of the seven channels, and the display position determining unit 215 determines display positions of the television program information on the monitor 109.

The displaying unit 216 outputs television program information of the seven channels to display the television program information on the monitor 109 (screen 338). The transition of screen display on the monitor 109 is similar to that of the case where the channel selecting operation speed of channel-surfing is determined to be slow (the screens 339 to 341), as described with reference to FIG. 6A.

Although the channels are changed in ascending order, from 2 to 3, and then to 4 using the Channel-up key in the description above, the Channel-down key may be used instead for changing channels in descending order. In other words, channels may be changed in ascending or descending order using the Channel-up key or the Channel-down key.

FIGS. 7 to 10 show screen images of thumbnail lists when a channel selecting operation is performed through the channel-surfing described above.

Figure 7:
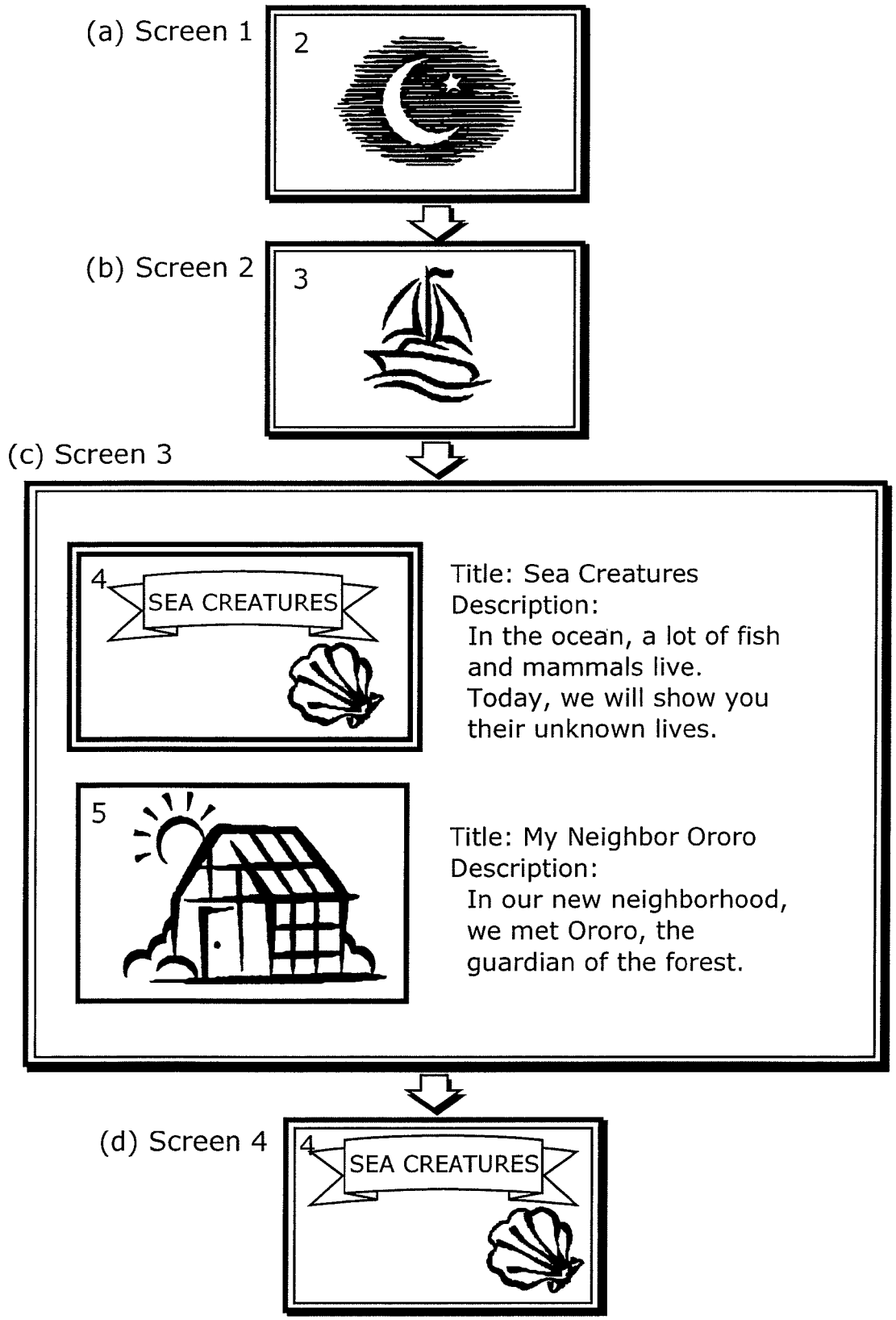
FIG. 7 shows a screen image of a thumbnail list according to the first embodiment of the present invention in the case where a channel selecting operation speed is determined to be slow.

FIG. 7 shows a screen image of a thumbnail list according to the first embodiment of the present invention in the case where a channel selecting operation speed is determined to be slow. In other words, FIG. 7 specifically shows the screen images shown in FIG. 6A.

The screens 1 to 3 shown in (a) to (c) in FIG. 7 are the screens 330 to 332 shown in FIG. 6A, respectively. The screen 4 in (d) in FIG. 7 is the screen 334 shown in FIG. 6A. The screen 3 is a screen image in the case where a channel selecting operation speed is determined to be slow. The thumbnail list shows still images, titles, and summaries of television programs on two channels (channel numbers 4 and 5) that have channel numbers subsequent to that of the current channel.

Figure 8:
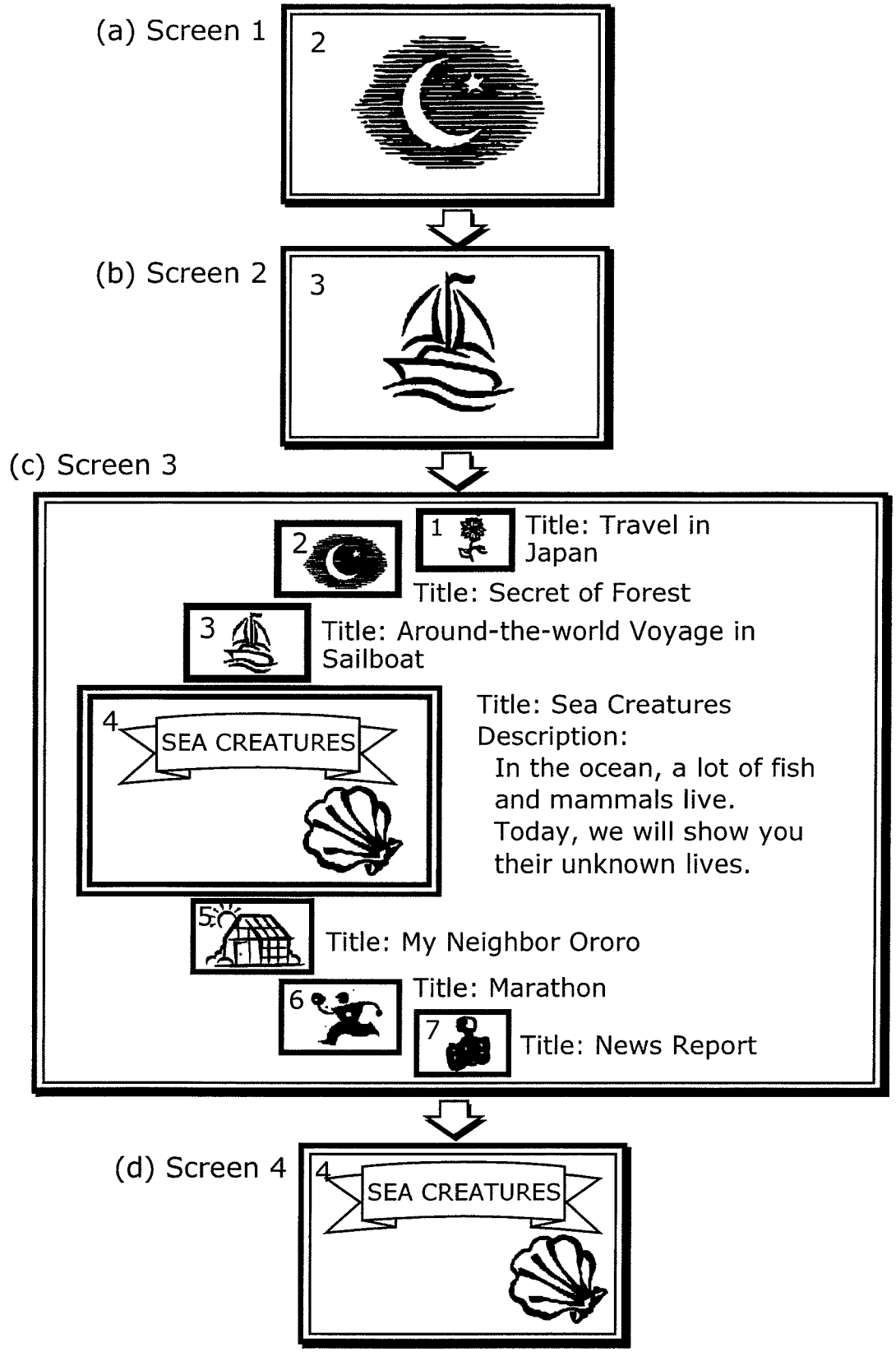
FIG. 8 shows screen images of a thumbnail list according to the first embodiment of the present invention in the case where a channel selecting operation speed is determined to be fast.

FIG. 8 shows screen images of a thumbnail list according to the first embodiment of the present invention in the case where a channel selecting operation speed is determined to be fast.

The screens 1 to 3 shown in (a) to (c) in FIG. 8 are the screens 336 to 338 shown in FIG. 6B, respectively. The screen 4 in (d) in FIG. 8 is the screen 340 shown in FIG. 6B. The screen 3 is a screen image in the case where a channel selecting operation speed is determined to be fast. The screen 3 shows details of seven television programs on the channel with the channel number 3, which is the current channel; the channels that have channel numbers to follow that of the current channel, the channels with the channel numbers 4, 5, 6, and 7; and the channels that have channel numbers to precede that of the current channel, the channels 2 and 1.

FIG. 9 shows screen images of a thumbnail list according to the first embodiment of the present invention in the case where all the thumbnails in a list have the same size. Specifically, FIG. 9 shows screen images in the case where all the thumbnails in the screen 3 shown in (c) in FIG. 8 have the same size.

In the screen 3 in (c) of FIG. 8, thumbnails increases in size as they become farther from the thumbnail of current channel, and the thumbnail of the channel 4, which is the closest to the current channel, is displayed the largest. These thumbnails may be displayed in the same size as shown in the screen 3 in (c) of FIG. 9 as long as users are provided with television program information to check.

The television program information to be used for the thumbnail list may include not only still images, television program titles, or summaries but also moving pictures instead of the still pictures, and any information with which a television program can be identified.

Figure 10:
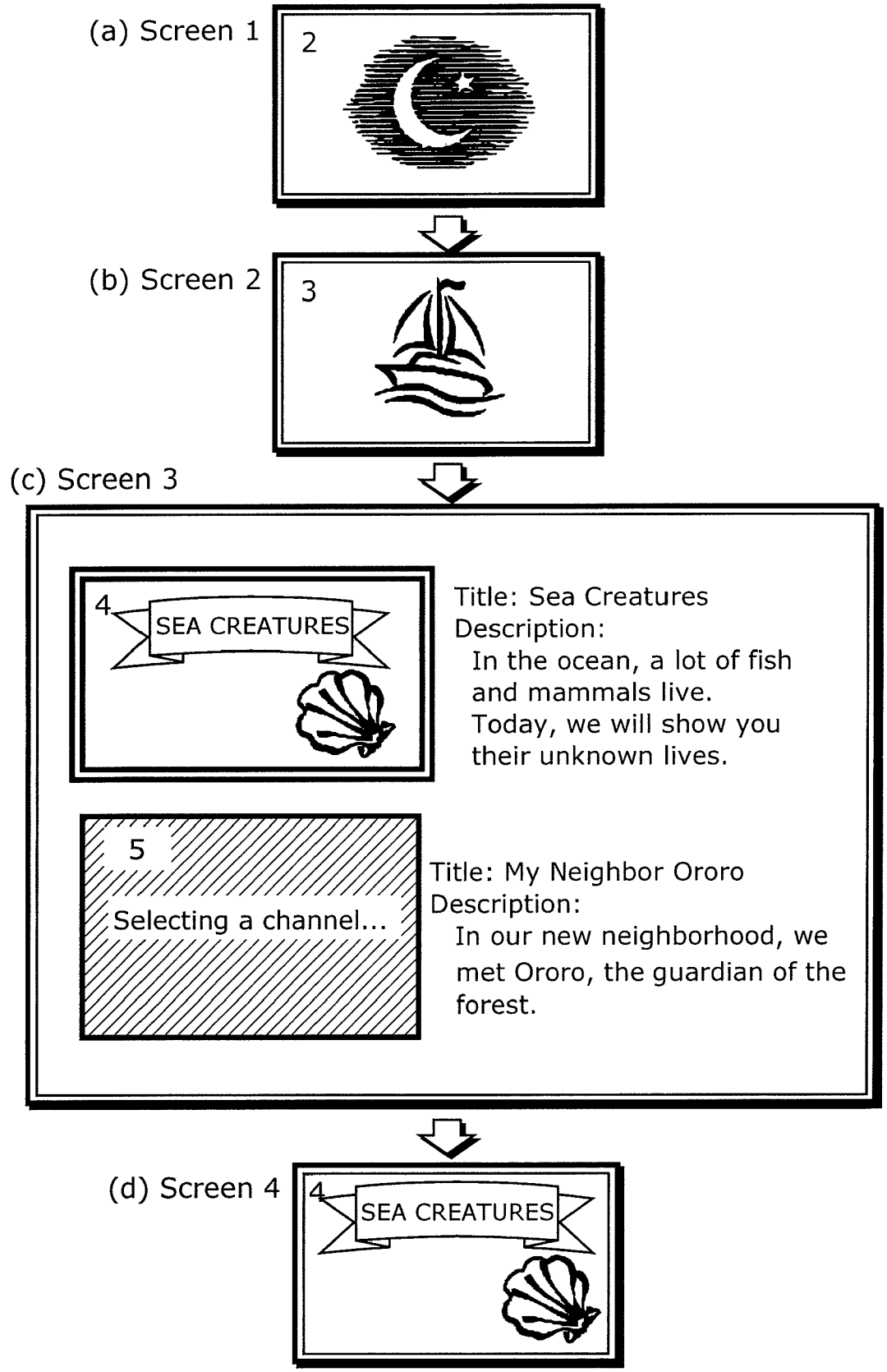
FIG. 10 shows screen images of a thumbnail list according to the first embodiment of the present invention before still images of channels to be listed are generated.

FIG. 10 shows screen images of a thumbnail list according to the first embodiment of the present invention before still images of channels to be listed are generated. Specifically, FIG. 10 shows screen images in the case where still images of the channels to be listed in the screen 3 shown in (c) in FIG. 7 are generated.

In the case where generating a still image takes some time, this may be indicated with a text information that shows a process status of the broadcast receiving apparatus 10, such as "Selecting a channel . . . " or "Checking parental control . . . ", along with details of television programs against a dark screen as shown in the screen 3 in (c) of FIG. 10 until the still image of the channel for which a thumbnail is to be listed. When the still image is generated, the thumbnail list is updated to show the still image as usual, as shown in the screen 3 in (c) of FIG. 7.

Text information such as "Restricted channel" may be presented when a still image is made unavailable by parental control.

This enables users to check the status of the apparatus and to read the details of the television program on the screen to proceed with channel-surfing, thus resulting in quick and smooth operation.

A series of operations of the broadcast receiving apparatus 10 in the first embodiment of the present invention is described below with reference to FIG. 11.

Figure 11:
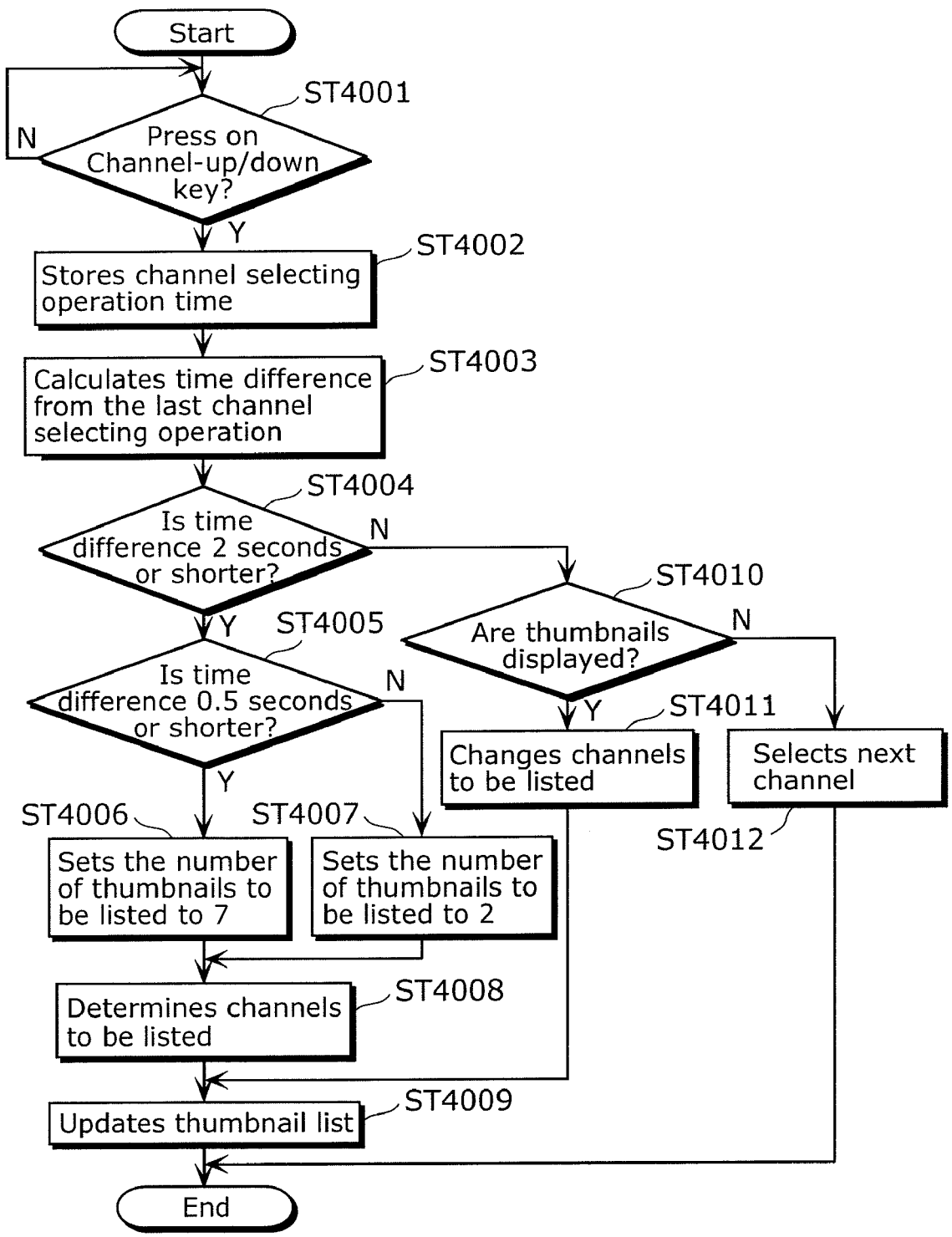
FIG. 11 is a flowchart showing the method for displaying a thumbnail list on the basis of the operation speed of channel selecting operations in the first embodiment of the present invention.

FIG. 11 is a flowchart showing the method for displaying a thumbnail list on the basis of the operation speed of channel selecting operations in the first embodiment of the present invention. Specifically, FIG. 11 is a flowchart of displaying information of television programs on currently broadcasted channels as a thumbnail list according to the first embodiment of the present invention. The number of thumbnails to be listed thereon is determined according to the speed of channel selection using the Channel-up and the Channel-down keys.

Here, it is assumed that the broadcast receiving apparatus 10 receives a TS that has a structure of the MPEG2-TS shown in FIG. 3B. FIG. 11 also includes a flowchart after the second press on the Channel-up key, which starts channel-surfing, in the images of operations by the user in FIGS. 6A and 6B. In the case where broadcasting stations broadcast television programs on twelve channels (the channels 1 to 12), the user gives one press to the Channel-up key while watching the channel 2, and then watches the channel 3. The channel selecting operation time memory unit 209 stores the time at which the last channel selecting operation has been performed.

First, a key code is inputted into the operation speed calculating unit 211 via the operation detecting unit 111. The operation speed calculating unit 211 determines whether the inputted key code indicates either the Channel-up key or the Channel-down key (ST4001).

When determining that the inputted key code indicates either the Channel-up key or the Channel-down key (Y in ST4001), the operation speed calculating unit 211 causes the channel selecting operation time memory unit 209 to store the time at which the current channel selecting operation is performed (ST4002).

The operation speed calculating unit 211 then compares the time of the current channel selecting operation and the time of the last channel selecting operation stored in the channel selecting operation time memory unit 209 in order to calculate a time difference between the two channel selecting operations as a channel selecting operation speed (ST4003).

Next, the list item count determining unit 212 determines whether or not the time difference between the operations is 2 seconds or shorter (ST4004). When determining that the time difference between the times of the operations is 2 seconds or shorter (Y in ST4004), the list item count determining unit 212 then determines whether or not the time difference between the operations is 0.5 seconds or shorter (ST4005).

When determining that the time difference between the operations is 0.5 seconds or shorter (Y in ST4005), the list item count determining unit 212 then determines that the operation speed is fast and sets the number of thumbnails to be listed to seven (ST4006).

When determining that the time difference between the operations is not 0.5 seconds or shorter (N in ST4005), the list item count determining unit 212 then determines that the operation speed is slow and sets the number of thumbnails to be listed to two (ST4007).

Then, the channel determining unit 213 determines channels to be listed, which is of the number of the thumbnails to be listed, by selecting from channels with channel numbers that are subsequent to, or precede or follow that of the current channel depending on whether the operation is performed with the Channel-up key or the Channel-down key (ST4008).

The television program information generating unit 214 generates television program information of channels determined to be the channels for which thumbnails are listed in order to update a thumbnail list. For this purpose, the television program information generating unit 214 obtains video data from a PMT corresponding to a channel number and generates a still image by stopping the video data at a desired playing time during AV decoding. The television program information generating unit also obtains television program titles and summaries from an EIT having a service ID identical to that of the PMT in order to generate television program information. Here, channel numbers are numbers of the channels to be listed. The display position determining unit 215 determines display positions of the television program information of the channels to be listed on a screen according to the channel numbers stored in the channel information memory unit 208 and the determined number of thumbnails to be listed. The displaying unit 216 outputs the generated television program information of the channels to be listed to the monitor 109 to display thumbnails (ST4009).

When the list item count determining unit 212 determines that the time difference between the operations is longer than 2 seconds (N in ST4004), the channel determining unit 213 determines whether or not the monitor 109 is displaying thumbnails (ST4010). When determining that the monitor 109 is displaying thumbnails (Y in ST4010), the channel determining unit 213 changes channels to be listed (ST4011). The displaying unit 216 then outputs television program information of the channels after the changing and updates the thumbnail list on the monitor 109 (ST4009).

When determining that the monitor 109 is not displaying thumbnails (N in ST4010), the channel determining unit 213 selects the next channel (ST4012).

Although the numbers of thumbnails to be listed used for describing the first embodiment are limited to two and seven, any number is applicable instead as long as more thumbnails are listed when channel selecting operation is determined to be fast than when determined to be slow. The criteria of a time difference between channel selecting operations for determining the number of thumbnails to be listed are not limited to the values used above, and may be any values.

Unlike the conventional technique with which channel-surfing is automatically detected and information of television programs currently broadcasted on all the available channels is listed, the first embodiment of the present invention thereby changes the number of channels for which thumbnails are listed depending on a speed of channel selecting operations by a user.

Accordingly, thumbnails of all the available channels are listed as soon as a user starts channel-surfing by a channel selecting operation without pressing a specific key, and the number of thumbnails to be listed is changed according to the speed of the channel selecting operations. This enables the user to quickly select a desired television program from a channel list that shows details of as many or few television programs as can be seen by the user with ease even when a large number of channels are available.

(Second Embodiment)

In the first embodiment, the operation speed calculating unit 211 calculates the speed of channel selecting operations of channel-surfing on the basis of a time difference between the channel selecting operations. In the second embodiment, the operation speed calculating unit 211 calculates the speed of channel selecting operation on the basis of the number of operations in a certain period time.

Operation in this case is described with reference to images of operations by a user shown in FIGS. 12A and 12B and a flowchart shown in FIG. 13. Since the configuration of the broadcast receiving apparatus 10 not shown in these figures is the same as shown in FIGS. 1 to 5 which are used for describing the first embodiment, a detailed description thereof is omitted.

First, images of operations by a user are described below with reference to FIGS. 12A and 12B.

FIGS. 12A and 12B show points of time at which a user performs channel selecting operations and screen images at those points of time on the basis of the number of operations in a certain period of time according to the second embodiment of the present invention.

FIG. 12A shows points of time of presses on the key for selecting a channel and screen images at those points of time in the case where channel selecting operation speed is slow.

As shown in FIG. 12A, when the user is watching the channel 2 (screen 330), the user gives a press 310 to the Channel-up key to switch to the channel 3 (screen 331) as in the case described with reference to FIG. 6A. The press 310 on the Channel-up key activates a timer for measuring 2 seconds.

In the case where the user gives a press 311 to the Channel-up key after 1.5 seconds of the press 310 on the Channel-up key, the broadcast receiving apparatus 10 determines that channel-surfing is started while the timer for measuring 2 seconds is active, and then transitions to a thumbnail list.

Specifically, the operation detecting unit 111 detects the press 310 and the press 311 on the Channel-up key, which are channel selecting operations while the timer is active. The operation speed calculating unit 211 calculates a channel selecting operation speed from the presses 310 and 311 on the Channel-up key. Here, since the press 311 on the Channel-up key occurred after 1.5 seconds of the press 310, the operation speed calculating unit 211 obtains a channel selecting operation speed of 1.5 seconds per press.

The number of thumbnails to be listed, which is determined by the list item count determining unit 212, increases as the channel selecting operation speed calculated by the operation speed calculating unit 211 becomes faster. More specifically, when the number of channel selecting operations is not less than four times in 2 seconds (channel selecting operation speed is equal to or faster than 0.5 seconds per press), the list item count determining unit 212 determines that the channel selecting operation speed is fast and sets the number of thumbnails to be listed to seven. When the number of channel selecting operations is not more than three times in 2 seconds (channel selecting operation speed is equal to or faster than 0.5 seconds per press), the list item count determining unit 212 determines that the channel selecting operation speed is slow and sets the number of thumbnails to be listed to two.

In this case, since the number of channel selecting operations is as small as two, the list item count determining unit 212 determines that the speed of the channel selecting operations for channel-surfing is slow and that the number of thumbnails to be listed is set to two.

The channel determining unit 213 determines two channels that have channel numbers subsequent to that of the current channel as channels to be listed. The displaying unit 216 outputs the television program information of the two channels determined by the channel determining unit 213 to display the television program information on the monitor 109 (screen 332). Since the screen images (screens 333 to 335) displayed when the user then gives presses 312 and 313 to the Channel-up key are the same as screen images displayed when the presses 302 and 303 are given to the Channel-up key as shown in FIG. 6A, a detailed description thereof is omitted.

FIG. 12B shows points of time of presses on the key for selecting a channel and screen images at those points of time in the case where channel selecting operation speed is fast.

As shown in FIG. 12B, a press 314 on the Channel-up key causes the screen to transition to the channel 3 (screen 337), and then presses 315, 316, and 317 are given to the Channel-up key during the timer for measuring 2 seconds is active. In this case, since the number of channel selecting operations performed while the timer is active is as large as four, the list item count determining unit 212 determines that the speed of the channel selecting operations for channel-surfing is fast and sets the number of thumbnails to be displayed to seven. The displaying unit 216 displays television program information of the seven channels on the monitor 109 (screen 338). Since the screen images (screens 339 to 341) displayed when the user then gives presses 318 and 319 to the Channel-up key are the same as screen images displayed when the presses 306 and 307 are given to the Channel-up key as shown in FIG. 6B, a detailed description thereof is omitted.

As stated above, the channel selecting operation speed is calculated by the operation speed calculating unit 211 becomes faster with an increase in the number of channel selecting operations detected by the operation detecting unit 111 in a certain period of time.

Figure 13:
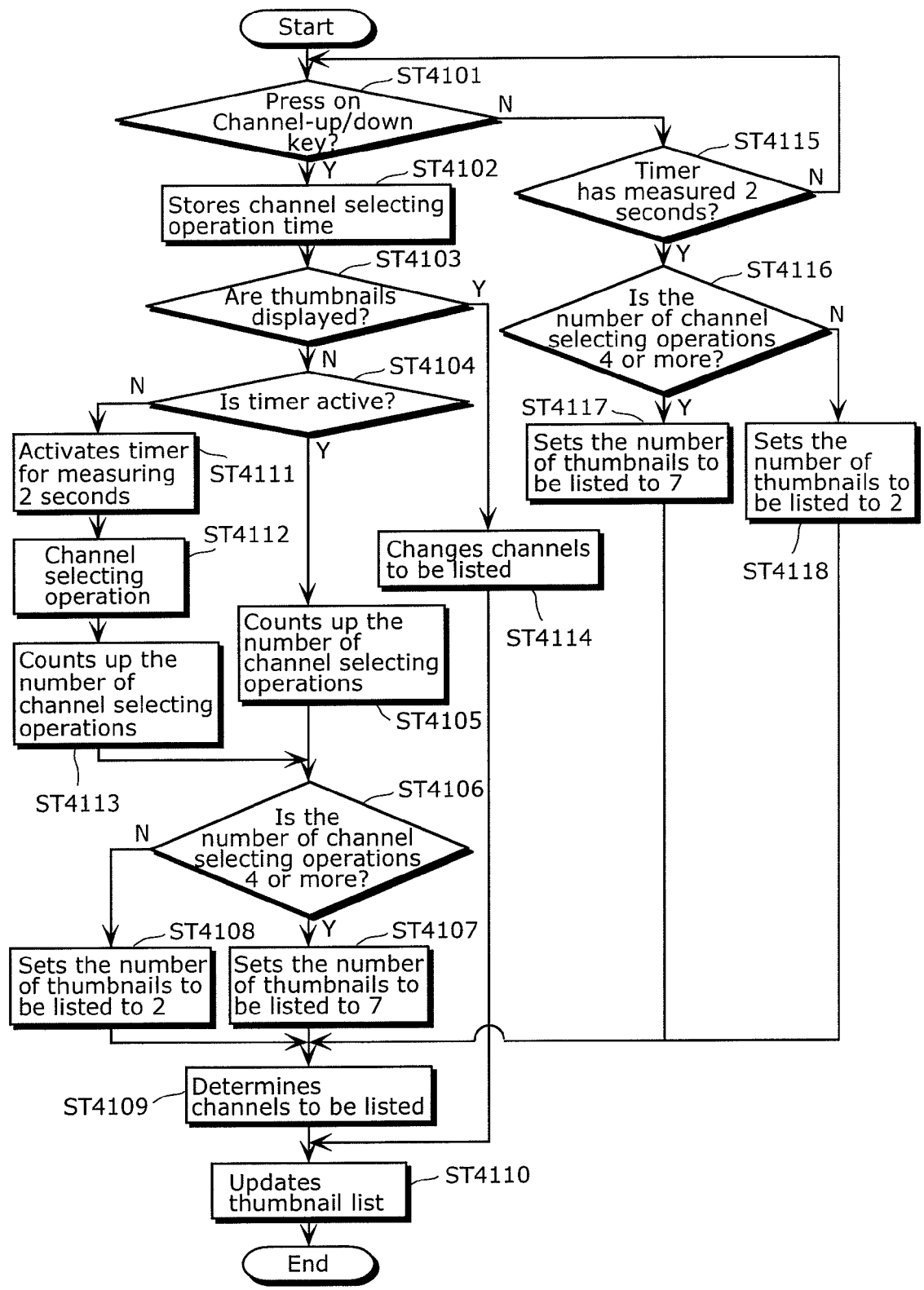
FIG. 13 is a flowchart showing the method for displaying a thumbnail list on the basis of the number of operations in a certain period of time according to the second embodiment of the present invention.

The flowchart in FIG. 13 is described below.

FIG. 13 is a flowchart showing the method for displaying a thumbnail list on the basis of the number of operations in a certain period of time according to the second embodiment of the present invention.

Here, it is assumed that the method includes the timer for measuring 2 seconds in addition to what is described with reference to the flowchart in FIG. 11, and that the timer is activated when the first press is given to the Channel-up key.

A key code of a channel selecting operation by a user is inputted into the operation speed calculating unit 211 via the operation detecting unit 111. The operation speed calculating unit 211 determines whether the inputted key code indicates either of the Channel-up key or the Channel-down key (ST4101). When the operation speed calculating unit 211 determines that the inputted key code indicates either of the Channel-up key or the Channel-down key (Y in ST4101), the operation speed calculating unit 211 causes the channel selecting operation time memory unit 209 to store the time at which the current channel selecting operation was performed (ST4102).

The operation speed calculating unit 211 then determines whether or not the monitor 109 is displaying thumbnails (ST4103). When determining that the monitor 109 is not displaying thumbnails (N in ST4103), the operation speed calculating unit 211 determines whether or not the timer for measuring 2 seconds is active (ST4104). When determining that the timer for measuring 2 seconds is active (Y in ST4104), the operation speed calculating unit 211 counts up the number of channel selecting operations (ST4105).

When determining that the timer for measuring 2 seconds is not active (N in ST4104), the operation speed calculating unit 211 activates the timer (ST4111). The operation speed calculating unit 211 then receives a key code indicating a channel selecting operation via the operation detecting unit 111 (ST4112). Subsequently, the operation speed calculating unit 211 counts up the number of channel selecting operations (ST4113).

Following this, the list item count determining unit 212 determines whether or not the number of channel selecting operations is equal to or more than four (ST4106). When determining that the number of channel selecting operations is three or less, the list item count determining unit 212 sets the number of thumbnails to be listed to two (ST4108). When determining that the number of channel selecting operations is four or more, the list item count determining unit 212 determines, even while the timer is still active, that the channel selecting operation speed is fast and sets the number of thumbnails to be listed to seven (ST4107). Following this, as is the processes in ST4008 and ST4009 in FIG. 11, channels to be listed are determined (ST4109) and the thumbnail list is updated (ST4110).

When the operation speed calculating unit 211 determines that the monitor 109 is displaying thumbnails (Y in ST4103), the channel determining unit 213 changes channels to be listed (ST4114), and the displaying unit 216 updates the thumbnail list (ST4110).

When determining that the inputted key code indicates neither the Channel-up key nor the Channel-down key (N in ST4101), the operation speed calculating unit 211 determines whether or not the timer has stopped after being active for two seconds (ST4115). When the operation speed calculating unit 211 determines that the timer has stopped after the two seconds (Y in ST4115), the list item count determining unit 212 determines whether or not the number of channel selecting operations is four or more (ST4116).

When determining that the number of channel selecting operations is three or less (N in ST4116), the list item count determining unit sets the number of thumbnails to be listed to two (ST4118). When determining that the number of channel selecting operations is four or more (Y in ST4116), the list item count determining unit sets the number of thumbnails to be listed to seven (ST4117). Following this, as is the processes in ST4008 and ST4009 in FIG. 11, channels to be listed are determined (ST4109) and the thumbnail list is updated (ST4110).

(Third Embodiment)

In the first and second embodiments, the operation speed calculating unit 211 calculates the speed of channel selecting operations for channel-surfing from a time difference between channel selecting operations or from the number of operations in a certain period of time. In the third embodiment, the operation speed calculating unit calculates the speed of channel selecting operations from a press on a key for a certain period of time.

Operation in this case is described with reference to images of operations by a user shown in FIGS. 14A and 14B and a flowchart shown in FIG. 15. Since the configuration of the broadcast receiving apparatus 10 not shown in these figures is the same as shown in FIGS. 1 to 5 which are used for describing the first embodiment, a detailed description thereof is omitted.

First, images of an operation by a user are described below with reference to FIGS. 14A and 14B.

FIGS. 14A and 14B show points of time at which a user performs channel selecting operations and screen images at those points of time on the basis of a press for a certain period of time according to the third embodiment of the present invention.

FIG. 14A shows points of time of presses on the key for selecting a channel and screen images at those points of time in the case where channel selecting operation speed is slow.

As shown in FIG. 14A, the user gives a press 320 to the Channel-up key to switch to the channel 3 (screen 331) when the user is watching the channel 2 (screen 330), as is the case described with reference to FIG. 6A.

When the press 320 on the Channel-up key is continued for over 0.5 seconds, the broadcast receiving apparatus 10 determines that channel-surfing is started and transitions to a thumbnail list.

Specifically, the operation detecting unit 111 detects to the press 320 on the Channel-up key, which is a channel selecting operation, in order to detect a period of time for which an operation to select a channel is performed. Here, it is assumed that the press 320 on the Channel-up key is continued for 1 second. The operation speed calculating unit 211 calculates the channel selecting operation speed from the period of time for which the press 320 on the Channel-up key is continued. The channel selecting operation speed is calculated by the operation speed calculating unit 211 becomes faster as a period of time detected by the operation detecting unit 211 becomes longer.

The number of thumbnails to be listed, which is determined by the list item count determining unit 212, increases as the channel selecting operation speed calculated by the operation speed calculating unit 211 becomes faster. More specifically, when the period of time detected by the operation detecting unit 111 is 2 seconds or longer, the list item count determining unit 212 determines that the channel selecting operation speed is fast sets the number of thumbnails to be listed to seven. When the period of time detected by the operation detecting unit 111 is shorter than 2 seconds, the list item count determining unit 212 determines that the channel selecting operation speed is slow and sets the number of thumbnails to be listed to two.

In this case, since the period of time for which the press of a channel selecting operation is continued is short, the list item count determining unit 212 determines that the channel selecting operation speed for channel-surfing is determined to be slow and sets the number of thumbnails to be listed to two.

The channel determining unit 213 determines two channels that have channel numbers subsequent to that of the current channel as channels to be listed. The displaying unit 216 outputs the television program information of the two channels determined by the channel determining unit 213 to display the television program information on the monitor 109 (screen 332). Since the screen images (screens 333 to 335) displayed when the user then gives presses 321 and 322 to the Channel-up key are the same as screen images, displayed when the presses 302 and 303 are given to the Channel-up key as shown in FIG. 6A, a detailed description thereof is omitted.

FIG. 14B shows points of time of presses on the key for selecting a channel and screen images at those points of time in the case where channel selecting operation speed is fast.

As shown in FIG. 14B, a press 323 on the Channel-up key causes the screen to transition to the channel 3 (screen 337), and the press 332 is continued for 2.5 seconds. In this case, since the number of channel selecting operations is long, the list item count determining unit 212 determines that the speed of the channel selecting operations for channel-surfing is determined to be fast and sets the number of thumbnails to be displayed to seven. The displaying unit 216 displays television program information of the seven channels on the monitor 109 (screen 338). Since the screen images (screens 339 to 341) displayed when the user then gives presses 324 and 325 to the Channel-up key are the same as screen images displayed when the presses 306 and 307 are given to the Channel-up key as shown in FIG. 6B, a detailed description thereof is omitted.

Figure 15:
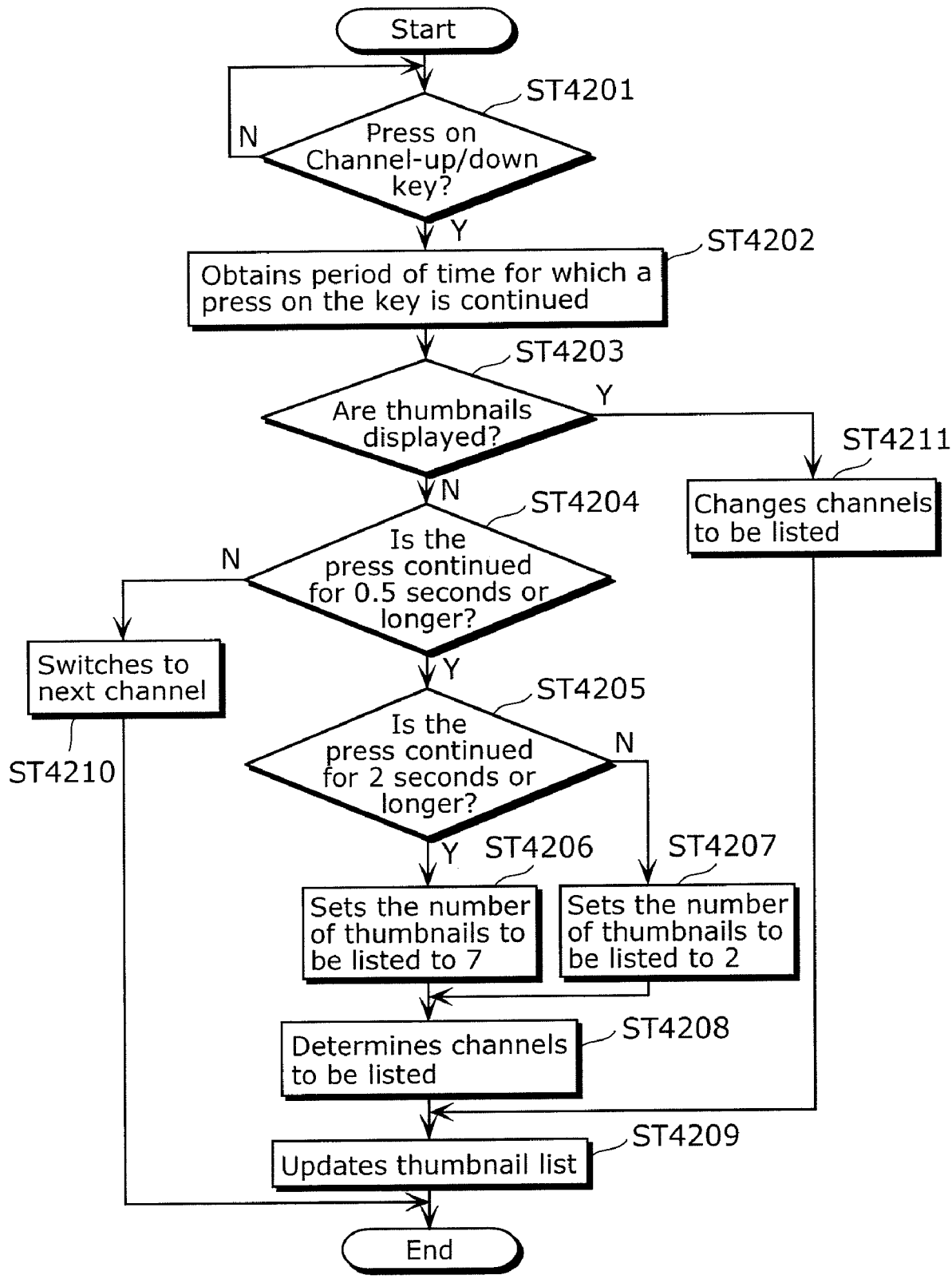
FIG. 15 is a flowchart showing the method for displaying a thumbnail list on the basis of a certain period of time for which a press is continued in the third embodiment of the present invention.

The flowchart in FIG. 15 is described below.

FIG. 15 is a flowchart showing the method for displaying a thumbnail list on the basis of a certain period of time for which a press is continued in the third embodiment of the present invention.

Here, what is assumed is the same as the case described with reference to the flowchart in FIG. 11.

A key code of a channel selecting operation by a user is inputted into the operation speed calculating unit 211 via the operation detecting unit 111. The operation speed calculating unit 211 determines whether the inputted key code indicates either of the Channel-up key or the Channel-down key (ST4201). When the key code indicates either of the Channel-up key or the Channel-down key (Y in ST4201), the operation speed calculating unit 211 measures a period of time for which the press on the Channel-up key or the Channel-down key is continued (ST4202).

The operation speed calculating unit 211 determines whether or not the monitor 109 is displaying thumbnails (ST4203). When determining that the monitor 109 is not displaying thumbnails (N in ST4203), the operation speed calculating unit 211 determines whether or not the period of time of the press is 0.5 seconds or more (ST4204).

When the operation speed calculating unit 211 determines that the period of time of the press is 0.5 seconds or longer (Y in ST4204), the list item count determining unit 212 determines whether or not the period of time of the press is 2 seconds or longer (ST4205). When determining that the period of time of the press is shorter than 2 seconds, the list item count determining unit 212 sets the number of thumbnails to be listed to two (ST4207). When determining that the period of time of the press is 2 seconds or longer, the list item count determining unit 212 sets the number of thumbnails to be listed to seven (ST4206). Following this, as is the processes in ST4008 and ST4009 in FIG. 11, channels to be listed are determined (ST4208) and the thumbnail list is updated (ST4209).

When the operation speed calculating unit 211 determines that the monitor 109 is displaying thumbnails (Y in ST4203), the channel determining unit 213 changes channels to be listed (ST4211), and the displaying unit 216 updates the thumbnail list (ST4209).

When the operation speed calculating unit 211 determines that the period of time of the press is shorter than 0.5 seconds (N in ST4204), the broadcast receiving apparatus 10 does not determine that channel-surfing is started and switches to the next channel for channel selection (ST4210).

In the first to third embodiments, a thumbnail list may return to a selected channel in full screen after a certain period of time or upon a press on a Select key by a user.

In the first to third embodiments, still images to be used in thumbnail lists are generated when channel-surfing is determined to be started as described above. In order to generate such still images, the television program information generating unit 214 selects channels and performs decoding. However, it is also possible that another decoder is installed in order that the television program information generating unit 214 may decode television programs on the channels and generate still images to be used for a thumbnail list while the user is watching a channel. Furthermore, it is also possible that the television program information generating unit 214 obtains still images included in transmitted data, such as DSMCC, which can be transmitted by broadcasting stations via a route different from the route of TSs.

(Fourth Embodiment)

In the fourth embodiment of the present invention, the broadcast receiving apparatus 10, which has the configuration as described above for receiving a TS that contains audio data, video data, and data associated with television programs, changes the number of thumbnails to be listed according to change in the speed of channel selecting operations in channel-surfing by a user. Specifically, the broadcast receiving apparatus 10 according to the fourth embodiment of the present invention calculates the number of thumbnails to be listed according to the speed of channel selecting operation in channel-surfing by a user, and then displays a thumbnail list. Furthermore, the broadcast receiving apparatus 10 changes the number of thumbnails to be listed according to change in the speed of channel selecting operation.

First, an example of images of operations by a user is described with reference to FIG. 16A and FIG. 16B. Since the configuration of the broadcast receiving apparatus 10 not shown in these figures is the same as shown in FIGS. 1 to 5 which are used for describing the first embodiment, a detailed description thereof is omitted.

FIGS. 16A and 16B show points of time at which a user performs channel selecting operations screen images at those points of time on the basis of differences between speeds of operations for selecting a channel according to the fourth embodiment of the present invention.

Specifically, these figures show (i) points of time of channel selecting operations by a user successively pressing a Channel-up key to select a channel and (ii) screen images at those points of time in the case where broadcasting stations broadcast television programs on twelve channels (channel numbers 1 to 12), as shown in FIG. 3B, and the user is watching the channel 2.

FIG. 16A shows points of time of presses on the key for selecting a channel and screen images at those points of time in the case where channel selecting operation speed becomes faster.

As shown in FIG. 16A, when the user is watching the channel 2 (screen 530), the user gives a press 500 to the Channel-up key of the remote control 110 to have the channel 3 (screen 531) displayed in order to see what television program is currently broadcasted on another channel.

In the case where the user gives the Channel-up key a press 501 within 2 seconds of the press 500 on the Channel-up key, the broadcast receiving apparatus 10 determines that channel-surfing is started, and then transitions to a thumbnail list.

Specifically, the operation detecting unit 111 detects the press 500 and the press 501, which are channel selecting operations, given to the Channel-up key. The operation speed calculating unit 211 calculates channel selecting operation speed from the presses 500 and 501 on the Channel-up key. Here, it is assumed that the press 501 on the Channel-up key occurred after 1 second of the press 500. In other words, the operation speed calculating unit 211 obtains a channel selecting operation speed of 1 second per press.

The number of thumbnails to be listed, which is determined by the list item count determining unit 212, increases as the channel selecting operation speed calculated by the operation speed calculating unit 211 becomes faster. More specifically, when a channel selecting operation speed is equal to or faster than 0.5 seconds per press, the list item count determining unit 212 determines that the channel selecting operation speed is fast and sets the number of thumbnails to be listed to seven. When a channel selecting operation speed is slower than 0.5 seconds per press, the list item count determining unit 212 determines that the channel selecting operation speed is slow and sets the number of thumbnails to be listed to two.

In this case, the list item count determining unit 212 determines that the channel selecting operation speed for channel-surfing is slow and that the number of thumbnails to be displayed is two.

Next, the channel determining unit 213 determines channels to be listed so that the television program information is displayed for the number of thumbnails to be listed which is determined by the list item count determining unit 212. In this case, the channel determining unit 213 determines two channels that have channel numbers subsequent to that of the current channel as channels to be listed.

Following this, the television program information generating unit 214 generates program information of the two channels determined by the channel determining unit 213, and the display position determining unit 215 determines display positions of the program information on the monitor 109. The displaying unit 216 outputs details of the programs on the two channels determined by the channel determining unit 213 to display the television program information on the monitor 109 (screen 532).

Following this, in the case where the thumbnails are listed and the user gives a press 502 on the Channel-up key after 0.5 seconds of the press 500, the operation speed calculating unit 211 obtains a channel selecting operation speed of 0.5 seconds per press. In other words, the time difference between channel selecting operations is a half of the last time difference between channel selecting operations, and the channel selecting operation speed has become twice. The list item count determining unit 212 thus determines that the channel selecting operation speed has become fast and changes the number of thumbnails to be listed to seven.

Then, the channel determining unit 213 determines channels to be listed, and the television program information generating unit 214 generates new television program information of the channels for which thumbnails are displayed, and outputs the television program information so that the displaying unit 216 updates the thumbnail list (screen 533).

In the case where the monitor 109 displays the thumbnails and 5 seconds has passed since the last channel selecting operation, the broadcast receiving apparatus 10 selects a channel currently selected using a cursor and displays the channel in full screen (screen 534). As in the case of the press 500, the next channel 6 (screen 535) is displayed in the case where a press 503 is given to the Channel-up key when the channel is displayed in full screen (screen 534).

FIG. 16B shows points of time of presses on the key for selecting a channel and screen images at those points of time in the case where channel selecting operation speed slows.

As shown in FIG. 16B, when the user is watching the channel 2 (screen 536), the user gives a press 504 to the Channel-up key of the remote control 110 to have the channel 3 (screen 537) displayed.

When the operation detecting unit 111 detects a press 505 on the Channel-up key after 0.5 seconds of a press 504, the operation speed calculating unit 211 obtains a channel selecting operation speed of 0.5 seconds per press.

In this case, the list item count determining unit 212 determines that the channel selecting operation speed for channel-surfing is fast and sets the number of thumbnails to be listed to seven. The channel determining unit 213 determines seven channels that have channel numbers subsequent to that of the current channel as channels to be listed. Following this, the television program information generating unit 214 generates television program information of the seven channels, and the display position determining unit 215 determines display positions of the television program information on the monitor 109.

The displaying unit 216 outputs details of the television programs on the seven channels to display the television program information on the monitor 109 (screen 538).

Following this, in the case where the thumbnails are listed and the user gives a press 506 on the Channel-up key after 1 second of the press 505, the operation speed calculating unit 211 obtains a channel selecting operation speed of 1 second per press. In other words, the time difference between channel selecting operations is twice the last time difference between channel selecting operations, and the channel selecting operation speed has become a half. The list item count determining unit 212 thus determines that the channel selecting operation speed has become slow and changes the number of thumbnails to be listed to two.

Then, the channel determining unit 213 determines channels to be listed, and the television program information generating unit 214 generates new television program information of the channels for which thumbnails are displayed, and outputs the television program information so that the displaying unit 216 updates the thumbnail list (screen 539). The screen transition using a remote control such as transition to full screen display (screens 540, 541) are the same as in the case described above where the channel selecting operation speed is determined to have become fast.

Figure 17:
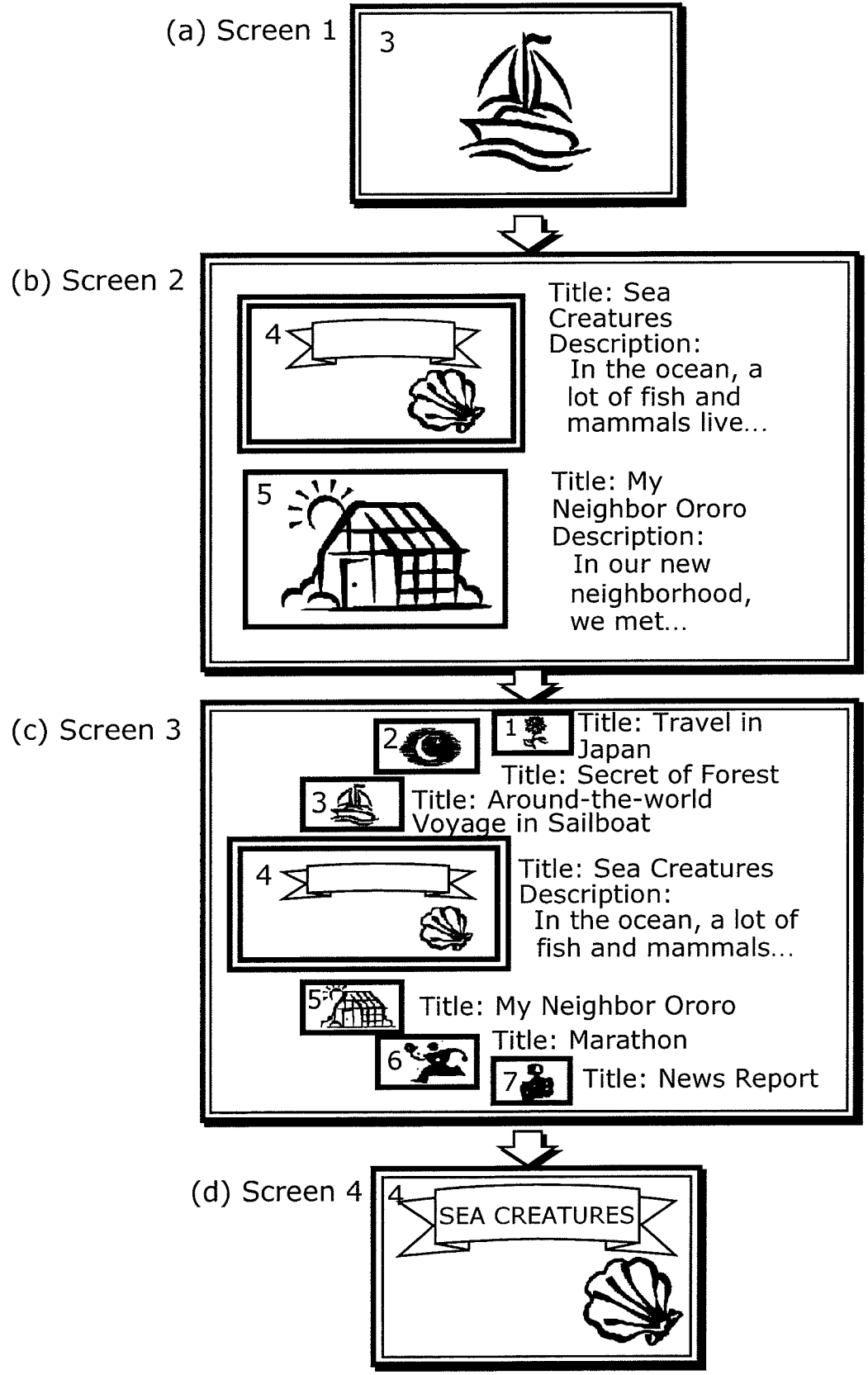
FIG. 17 shows screen images of thumbnail lists in the case where the speed of channel selecting operation is determined to have become fast according to the fourth embodiment of the present invention.

FIG. 17 shows screen images of thumbnail lists in the case where the speed of channel selecting operation is determined to have become fast according to the fourth embodiment of the present invention.

The screens 1 to 3 shown in (a) to (c) in FIG. 17 are the screens 531 to 534 shown in FIG. 16A, respectively. Specifically, (b) of FIG. 17 shows a thumbnail list screen in the case where channel-surfing has been started and channel selecting operation speed is determined to be slow. The thumbnail list shows still images, titles, and summaries of television programs of two channels that have channel numbers subsequent to that of the current channel (the channels 4 and 5).

The thumbnail list in (c) of FIG. 17 is displayed when farther channel selecting operations are performed with a time difference between channel selecting operations. The time difference is a half of the last time difference and the channel selecting operation speed is determined to have become fast. The number of thumbnails to be listed is then changed to seven. In this case, the thumbnail list shows details of seven television programs on the channel with the channel number 4, which is currently selected using a cursor; the channels that have channel numbers to follow that of the current channel, the channels with the channel numbers 5, 6, and 7; and the channels that have channel numbers to precede that of the current channel, the channels with the channel numbers 3, 2, and 1.

Figure 18:
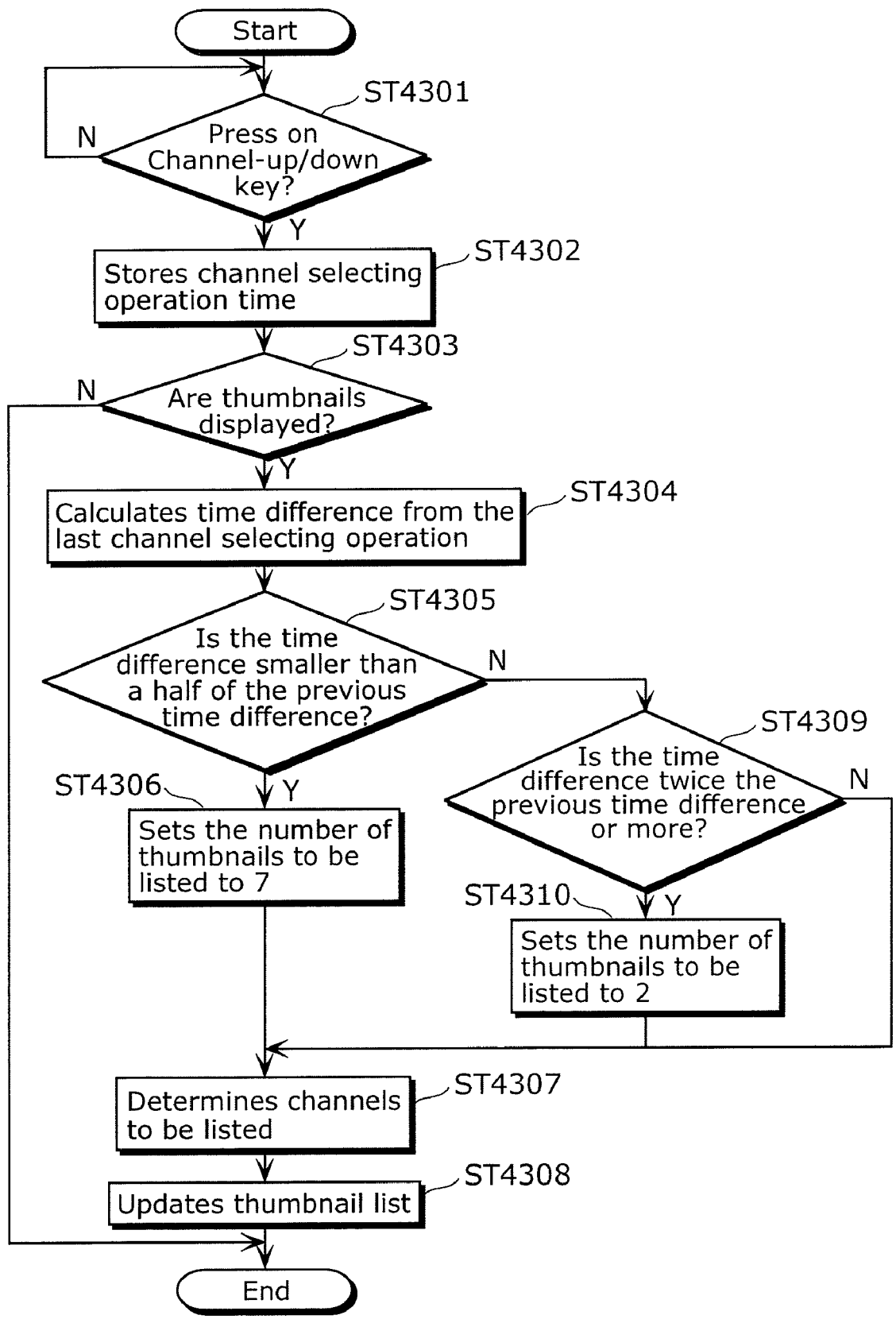
FIG. 18 is a flowchart showing the method for displaying a thumbnail list on the basis of the operation speed of channel selection in the fourth embodiment of the present invention.

FIG. 18 is a flowchart showing the method for displaying a thumbnail list on the basis of the operation speed of channel selection in the fourth embodiment of the present invention.

Here, it is assumed that the broadcast receiving apparatus 10 receives a TS that has a structure of the MPEG2-TS shown in FIG. 3B. FIG. 18 also includes a flowchart after the second press, upon which a thumbnail list is displayed, on the Channel-up key in the images of an operations by the user in FIGS. 16A and 16B. In the case where broadcasting stations broadcast television programs on twelve channels (the channel numbers 1 to 12), the user gives two presses to the Channel-up key while watching the channel 2 to have a thumbnail list displayed. Furthermore, it is also assumed that the time at which last channel selecting operation is performed is stored in the channel selecting operation time memory unit 209, and the time difference between the last two channel selecting operations is stored in the operation speed calculating unit 211.

First, a key code of a channel selecting operation by a user is inputted into the operation speed calculating unit 211 via the operation detecting unit 111. The operation speed calculating unit 211 determines whether the inputted key code indicates the Channel-up key or the Channel-down key (ST4301).

When determining that the inputted key code indicates either the Channel-up key or the Channel-down key (Y in ST4301), the operation speed calculating unit 211 then causes the channel selecting operation time memory unit 209 to store the current time at which channel selection is performed (ST4302).

The operation speed calculating unit 211 then determines whether or not the monitor 109 is displaying thumbnails (ST4303). Since a thumbnail list is displayed upon the two presses given to the Channel-up key, the operation speed calculating unit 211 determines that thumbnails are displayed (Y in ST4303).

The operation speed calculating unit 211 then compares the time of current channel selecting operation and the time of last channel selecting operation stored in the channel selecting operation time memory unit 209 in order to calculate a time difference between the two channel selecting operations as a channel selecting operation speed (ST4304).

Next, the list item count determining unit 212 compares the newly calculated time difference and the previous time difference in order to determine whether or not the newly calculated time difference is smaller than a half of the previous time difference (ST4305). When determining that the newly calculated time difference is smaller than a half of the previous time difference (Y in ST4305), the list item count determining unit 212 then determines that the operation speed has become fast and changes the number of thumbnails to be listed to seven (ST4306).

When determining that the newly calculated time difference is greater than a half of the previous time difference (Y in ST4305), the list item count determining unit 212 then determines whether or not the newly calculated time difference is twice the previous time difference or more (ST4309). When determining that the newly calculated time difference is twice the previous time difference or more (Y in ST4309), the list item count determining unit 212 determines that the channel selecting operation speed has become slow and changes the number of thumbnails to be listed to two.

Then, the channel determining unit 213 determines channels to be listed, which is of the number of the thumbnails to be listed, by selecting from channels with channel numbers that are subsequent to, or precede or follow that of the current channel depending on whether the operation is performed with the Channel-up key or the Channel-down key (ST4307). When the list item count determining unit 212 determines that the newly calculated time difference is smaller than twice the previous time difference (N in ST4309), the channel determining unit 213 changes and determines channels to be listed without changing the number of channels to be listed (ST4307).

The television program information generating unit 214 generates television program information of channels determined to be the channels for which thumbnails are listed in order to update a thumbnail list. For this purpose, the television program information generating unit 214 obtains video data contained in a PMT corresponding to a channel number and generates a still image by stopping the video data at a desired playing time during AV decoding. The television program information generating unit also obtains television program titles and summaries from an EIT having a service ID identical to that of the PMT in order to generate television program information. The display position determining unit 215 determines display positions of the television program information of the channels to be listed on a screen according to the channel numbers stored in the channel information memory unit 208 and the determined number of thumbnails to be listed. The displaying unit 216 outputs the generated television program information of the channels to be listed to the monitor 109 to display thumbnails (ST4308).

Unlike in the first to third embodiments where channel selecting operations performed while a thumbnail list is displayed changes not the number of thumbnails to be listed but channels to be listed, the fourth embodiment of the present invention enables a user to change the number of thumbnails to be listed as the user likes even while a thumbnail list is displayed.

Accordingly, since the number of thumbnails to be listed may be increased and decreased according as the user likes even while a thumbnail list is displayed, the user may quickly select a desired television program from a channel list that shows details of as many or few television programs as can be seen by the user with ease even when a large number of channels are available.

Although the numbers of thumbnails to be listed used for describing the fourth embodiment are limited to two and seven, any number is applicable instead as long as the number of thumbnails to be listed increases when channel selecting operation speed is determined to have become fast and decreases when channel selecting operation speed is determined to have become slow. The criteria of a time difference between channel selecting operations for changing and determining the number of thumbnails to be listed are not limited to the values used above, and may be any values.

Specifically, when channel selecting operation speed is determined to have become fast, the number of thumbnails to be listed may be increased to twice the current number of thumbnails to be listed. When channel selecting operation speed is determined to have become slow, the number of thumbnails to be listed may be decreased to half of the current number of thumbnails to be listed.

In this case, when the number of thumbnails to be listed that is to be changed upon a change in channel selecting operation speed becomes greater than a maximum number of thumbnails to be listed, the number of thumbnails to be listed may be set to the maximum number. When the number of thumbnails to be listed that is to be changed becomes one, the thumbnail list may return to full screen.

Although the list item count determining unit 212 determines the number of thumbnails to be listed according to channel selecting operation speed calculated from time differences between channel selecting operations, the list item count determining unit 212 may also determine the number of thumbnails to be listed according to the channel selecting operation speed calculated from the number of operations in a certain period time or a press on a key for a certain period of time.

Although the list item count determining unit 212 according to the first to fourth embodiments determines the number of thumbnails to be listed according to channel selecting operation speed for channel-surfing as described above, the number of thumbnails to be listed may be increased and decreased using Right and Left keys. Numeric keys may be also used for directly changing the number of thumbnails to be listed.

In other words, the operation detecting unit 111 may detect operations other than channel selecting operations, and the list item count determining unit 212 may determine, when such operations are detected, a number predetermined in association with the operations to be the number of thumbnails to be listed.

This enables a user to increase and decrease the number of channels to be listed physically by pressing specific buttons. This enables the user to quickly select a desired television program even when a large number of channels are available.

The broadcast receiving apparatus 10 described using the first to the fourth embodiment above may further include functions shown in the following variations.

(First Variation)

In the case of the broadcast receiving apparatus 10 according to the first variation, the list item count determining unit 212 determines the number of thumbnails to be listed on the basis of personal information of a user performing channel selecting operations. Here, the personal information of a user may be the age of the user.

FIGS. 19A and 19B show a function of the broadcast receiving apparatus 10 according to the first variation.

First, a user is assumed to be 25-year old as shown in FIG. 19 A.

When the age of a user is equal to or above a predetermined first age and is below a second age that is above the first age, the list item count determining unit 212 determines the number of thumbnails to be listed to be larger than when the age of the user is below the first age or when equal to or above the second age. In the first variation, it is assumed that the first age is 20 and that the second age is 30.

For the 25-year old user, who is above 20 and below 30, the list item count determining unit 212 determines the number of thumbnails to be listed to be larger than for a user below 20-year old or a user 30-year old or above. In the first variation, it is assumed that a user below 20-year old or 30-year old or above will have five thumbnails and that the list item count determining unit 212 determines that the number of thumbnails to be listed for 25-year old user is seven.

Next, a user is assumed to be 70-year old in FIG. 19B.

When the age of a user is equal to or above a predetermined third age, the number of thumbnails to be listed determined by the list item count determining unit 212 increases as the age of the user increases. In the first variation, it is assumed that the third age is 60.

For the 70-year old user, who is above 60-year old, the list item count determining unit 212 determines the number of thumbnails to be listed to be smaller than for a user below 60-year old. In the first variation, it is assumed that a user who is 30-year old or above and below 60-year old will have five thumbnails and that the list item count determining unit 212 determines that the number of thumbnails to be listed for the 70-year old user is two.

Furthermore, the list item count determining unit 212 determines that the number of thumbnails to be listed for a 65-year old user is four and that the number of thumbnails to be listed for a 68-year old user is three, for example. A thumbnail list is thus displayed so that older users will have thumbnails that are more easy to view.

This enables users to quickly select a desired television program from channels of a number optimized for age groups.

Although the personal information used for the first variation is the age of a user, an actual interval time of channel selecting operations or the actual count of channel selecting operations in a certain period time may be used instead.

Specifically, the list item count determining unit 212 may determine the number of thumbnails to be listed according to an actual time interval of channel selecting operations or the actual count of channel selecting operations in a certain period time so that users with a shorter time interval or more channel selecting operations will have a smaller number of thumbnails to be listed.

In this manner, the number of channels to be displayed may be determined using a user's personal history of time intervals of channel selecting operations or the number of channel selecting operations recorded by learning control or the like. This enables the user to quickly select a desired television program even when a large number of channels are available.

In the example above, the broadcast receiving apparatus 10 stores relationship between personal information and the number of thumbnails to be listed (ages and the numbers of thumbnails to be listed for this case) and identifies personal information of a user. The broadcast receiving apparatus 10 then determines the number of thumbnails to be listed corresponding to the identified personal information on the basis of the stored personal information and the number of thumbnails to be listed.

Here, the personal information may include not only ages as mentioned above. For example, the personal information may include data regarding fingerprints, birthdays, fingerprints and favorite categories, or combinations of them.

When fingerprints are included in the personal information, the broadcast receiving apparatus 10 stores personal information in which fingerprint data is associated with respective persons. A fingerprint recognition unit (not shown), such as a fingerprint sensor, installed on the remote control 110 then reads a fingerprint, and the broadcast receiving apparatus 10 may identify a personal information entry that matches the read fingerprint data among personal information entries in which the stored fingerprint data is associated with the persons and determine the number of thumbnails to be listed on the basis of the identified personal information.

When birthdays or favorite categories are included in the personal information, the broadcast receiving apparatus 10 stores personal information in which input information (regarding birthdays or favorite categories in this case) is associated with respective persons. When receiving input information from the remote control 110, the broadcast receiving apparatus 10 may identify a personal information entry that matches the input information among personal information entries in which the stored input information is associated with the persons and determine the number of thumbnails to be listed on the basis of the identified personal information.

In the case where there is a possibility that an information item, such as favorite categories, is relatively similar among persons and insufficient for identifying a person, it may be used in combination with another information item (birthdays, ages, for example) as the input information.

Furthermore, a mobile phone (not shown) may be used instead of the remote control 110. In this case, the broadcast receiving apparatus 10 has already stored personal information in which information for identifying the mobile phone is associated with the persons. When receiving an input from the mobile phone used as the remote control 110, the broadcast receiving apparatus 10 may identify a personal information entry among personal information entries, in which the information for identifying mobile phones used for the input and associated with the persons, and determine the number of thumbnails to be listed on the basis of the identified personal information entry.

(Second Variation)

In the case of the broadcast receiving apparatus 10 according to the second variation, the channel determining unit 213 determines channels to be listed on the basis of preferences in broadcast content categories.

Figure 20A:
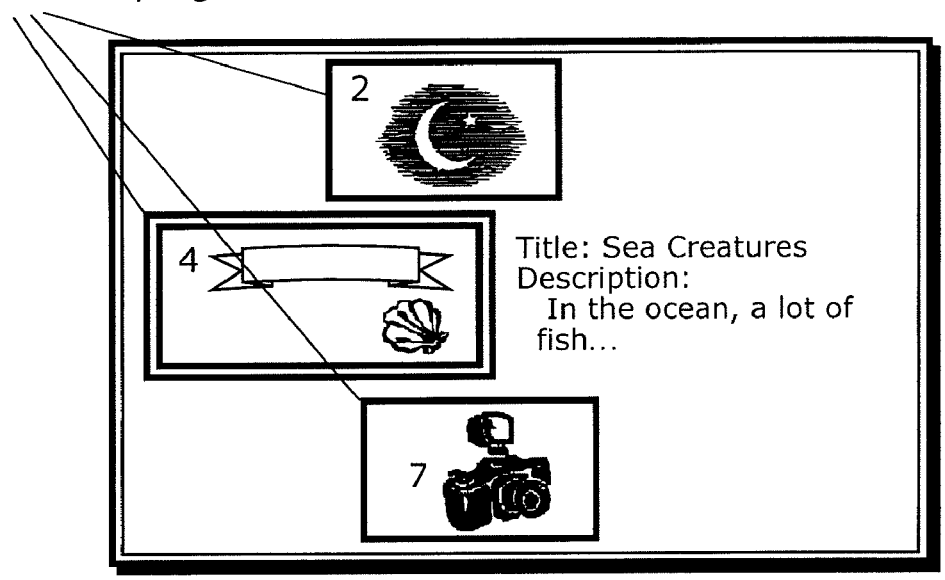
FIG. 20A shows a function of the broadcast receiving apparatus according to the second variation.
Figure 20B:
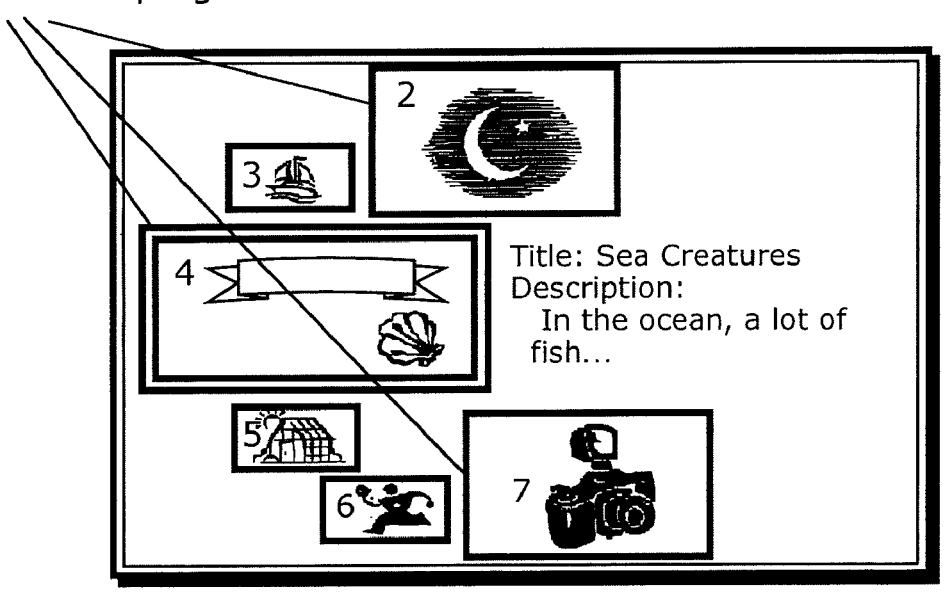
FIG. 20B shows a function of the broadcast receiving apparatus according to the first variation.

FIGS. 20A and 20B show a function of the broadcast receiving apparatus 10 according to the second variation.

First, a preference for variety television programs, which is one of the preferences in broadcast content categories, is assumed to be high.

In this case, as shown in FIG. 20A, the channel determining unit 213 determines channels to be listed so that variety television programs are preferentially listed. The displaying unit 216 then outputs television program information of the determined channels to be listed to the monitor 109 to display it on the monitor 109.

In this manner, channels to be listed may be determined by setting a preference for a television program category which a user prefers to high so that information of the television program category is displayed. This enables the user to quickly select a desired television program even when a large number of channels are available.

Furthermore, when the preferences are switched, the channel determining unit 213 determines channels to be listed on the basis of the preferences after the switching. Specifically, when a preference for news television programs is switched to higher than that for variety television programs, the channel determining unit 213 determines channels to be listed so that news television programs are preferentially listed.

In this manner, channels to be listed may be determined by switching favorite television program categories which the user wants to watch so that the user can have information of television programs that belong to the favorite television program category newly switched to. This enables the user to quickly select a desired television program even when a large number of channels are available.

Furthermore, although the channel determining unit 213 determines channel to be listed on the basis of the preferences in the second variation, it is also possible that the channel determining unit 213 does not make a determination on the basis of the preferences and that the displaying unit 216 outputs television program information so that channels with higher preferences in broadcast content categories are displayed larger.

Specifically, a preference for variety television programs, which is one of the preferences in broadcast content categories, is assumed to be high.

In this case, as shown in FIG. 20B, the displaying unit 216 outputs television program information to the monitor 109 so that variety television programs (on the channels with channel numbers 2, 4, 7) are displayed larger among channels to be listed (the channel numbers 2 to 7) on the monitor 109.

In this manner, information of television programs that belong to a user's favorite television program category is displayed in a larger size by setting the preference for the television program category to high. This enables the user to quickly select a desired television program even when a large number of channels are available.

(Third Variation)

For the broadcast receiving apparatus 10 according to the third variation, in the case where the number of channels is larger than the number of thumbnails to be listed, the channel determining unit 213 displays new channels by replacing channels which the cursor has passed with the new channels as a cursor is moved.

FIG. 21 shows a function of the broadcast receiving apparatus 10 according to the third variation.

It is assumed that the displaying unit outputs television program information of the channels 1 to 7 and that the monitor 109 displays the television program information as shown in (a) in FIG. 21. A user moves a cursor to television program information of the channel numbers 7, 6, and then 5 to select the television program information, and the cursor passes the television program information of the channels 5 to 7.

When the user moves the cursor to television program information of the channel number 4 to select the television program information, the channel determining unit 213 switches television program information of the channel numbers 5 to 7, which have been selected and passed, to television program information of new channels as shown in (b) in FIG. 21. The television program information of the new channels is not that of the channels with the channel numbers 1 to 7 which have been outputted by the displaying unit 216 but, specifically, television program information of channel numbers 11 and 12. In other words, the displaying unit outputs the television program information of the channels 11 and 12 instead of television program information of the channels 5 to 7 in order to display the television program information of the channel numbers 11 and 12 on the monitor 109.

In this manner, the channel determining unit 213 determines channels to be listed by causing the displaying unit 216 to output television program information of channels not yet outputted instead of television program information of selected channels which the displaying unit 216 has already outputted and the user has selected.

This thereby enables switching television program information of selected and passed channels to television program information of new channels in the order of selection of television program information by moving a cursor when a user selects television program information on the monitor. This will have new channels displayed successively. This enables the user to quickly select a desired television program even when a large number of channels are available.

The channel determining unit 213 may determine channels to be listed so that a channel number for which not television program information but "Selecting a channel . . ." or the like has been displayed remains listed even after being selected using a cursor.

(Fourth Variation)

In the case of the broadcast receiving apparatus 10 according to the fourth variation, the displaying unit 216 outputs television program information to the monitor 109 so that television program information of a currently selected channel is displayed larger than any other currently displayed channels.

Figure 22A:
FIG. 22A shows a function of the broadcast receiving apparatus according to the fourth variation.
Figure 22B:
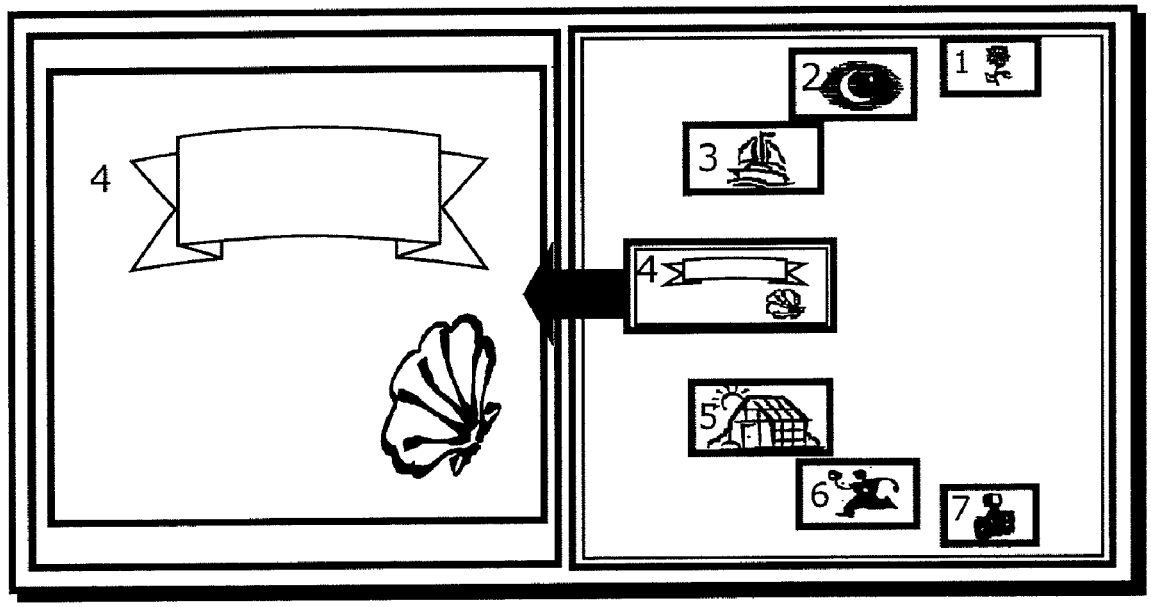
FIG. 22B shows a function of the broadcast receiving apparatus according to the fourth variation.

FIGS. 22A and 22B show a function of the broadcast receiving apparatus 10 according to the fourth variation.

As shown in FIG. 22A, television program information of the channel 4 is selected from television program information of the channel numbers 1 to 7 when a user moves a cursor to the television program information of the channel number 4. The displaying unit 216 then outputs television program information to the monitor 109 so that television program information of the selected channel number 4 is displayed larger. Accordingly, the television program information of the channel number 4 is displayed larger on the monitor 109.

When split-screen display is available on the monitor 109, the television program information of the channel number 4 may be displayed larger in the left screen of two split screens arranged side by side as shown in FIG. 22B, for example.

In this manner, when a user makes a selection from displayed television program information, television program information selected using a cursor may be displayed in a larger size in order to enable the user to view details of the television program information easily. This enables the user to quickly select a desired television program even when a large number of channels are available.

Furthermore, the displaying unit 216 may display television program information of channels larger as the respective channels become closer to the selected channel.

Specifically, as shown in FIG. 22A, the television program information of the channel number 4 is displayed larger than that of any other channels. The farther from the channel 4 the television program information is, the smaller it is displayed. More specifically, the television program information is displayed smaller in the order of the channel numbers 4, 3, 2, and 1, and also in the order of the channel numbers 4, 5, 6, and 7.

In this manner, when a user makes a selection from displayed television program information, television program information selected using a cursor may be displayed larger than television program information of any other channels, and less large as respective channels becomes farther from the selected channel. This enables the user to quickly select a desired television program even when a large number of channels are available.

(Fifth Variation)

In the case of the broadcast receiving apparatus 10 according to the fifth variation, the television program information generating unit 214 generates television program information of channels to be listed from television program information superimposed on a TS or from television program information generated through an idle tuner in multiple-tuner environment.

Figure 23:
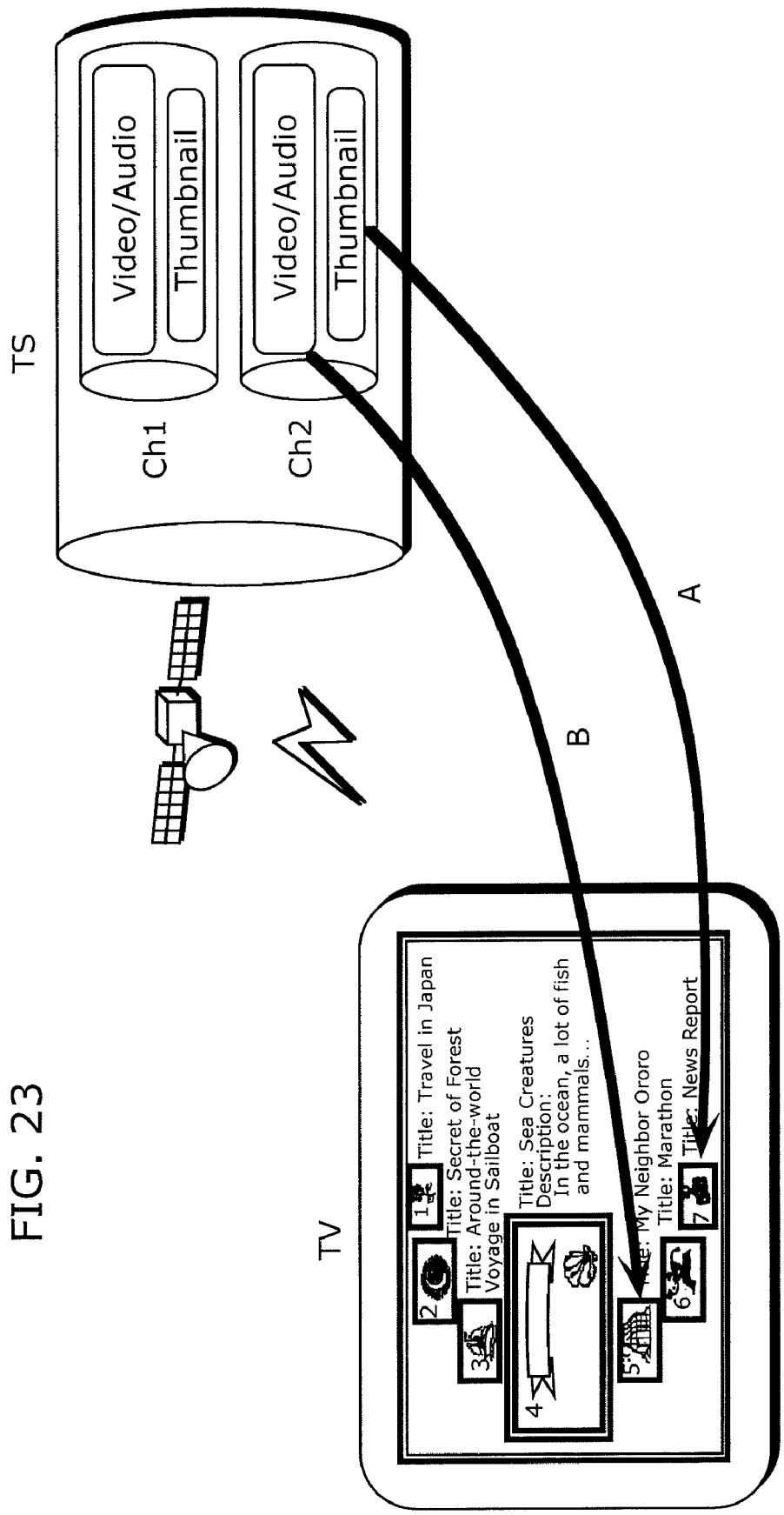
FIG. 23 shows a function of the broadcast receiving apparatus according to the fifth variation.

FIG. 23 shows a function of the broadcast receiving apparatus 10 according to the fifth variation.

As shown in FIG. 23, the television program information generating unit 214 obtains and generates television program information of channels to be listed from television program information superimposed on a TS (A in FIG. 23). The displaying unit 216 then displays the television program information of the channels to be listed obtained from the television program information superimposed on the TS.

Furthermore, as shown in FIG. 23, the broadcast receiving apparatus 10 includes a plurality of tuner units 101, and the television program information generating unit 214 generates television program information of the channels to be listed through one of the tuner units 101 not being used for receiving broadcast contents (B in FIG. 23). The displaying unit 216 then displays the television program information of the channels to be listed generated through the tuner unit 101 not being used for receiving broadcast contents. This enables displaying television program information in real time.

It is noted that each of the functional blocks shown in FIGS. 1 and 5 may be implement as an LSI, which is an integrated circuit. These functional blocks may be integrated into a separate single chip, or some or all of the functional blocks may be integrated into a single chip. Specifically, as shown in FIG. 24, all the functional blocks other than the cable card interface 106 and the HDD 112 (indicated with X in FIG. 24) may be integrated into single chips, for example.

Here, an integrated circuit is referred to as an LSI; the integration circuit may be referred to as an IC, a system LSI, a super LSI or a ultra LSI, depending on the degree of integration.

The method for forming integrated circuitry is not limited to use of such LSIs. Dedicated circuitry or a general-purpose processor may be used instead of such LSIs. Also applicable are a field programmable gate array (FPGA), which allows post-manufacture programming, and a reconfigurable processor LSI, which allows post-manufacture reconfiguration of connection and setting of circuit cells therein.

Furthermore, in the event that an advance in or derivation from semiconductor technology brings about an integrated circuitry technology whereby an LSI is replaced, the functional blocks may be obviously integrated using such new technology. The adaptation of biotechnology or the like is possible.

The scope of the present invention is not limited to these embodiments or variations of broadcast receiving apparatus described above.

In other words, the embodiments disclosed herein are exemplary in all respects and should never be considered limiting. The scope of the present invention is indicated not by the description above but by the claims, and is intended to include any modification within the scope and the sense of equivalents of the claims.

Industrial Applicability

A broadcast receiving apparatus according to the present invention that receives analog and digital television broadcast is applicable as a broadcast receiving apparatus that advantageously makes quick selection of a desired television program by channel-surfing possible.

The invention claimed is:

1. A broadcast receiving apparatus which receives broadcast content and outputs information of the received broadcast content as television program information of a channel for which the broadcast content is received, said broadcast receiving apparatus comprising:
 an operation detector configured to detect a channel selecting operation;
 an operation speed calculator configured to calculate a channel selecting operation speed from the detected channel selecting operation;
 a list item count determiner configured to determine, according to the calculated channel selecting operation speed, the number of channels for which the television program information is displayed;
 a channel determiner configured to determine channels to be listed so that the television program information is displayed for the determined number of channels; and
 a display configured to output the television program information of the determined channels to be listed,
 wherein said list item count determiner is configured to determine the number of channels such that the number of channels increases as the calculated channel selecting operation speed becomes faster.

2. The broadcast receiving apparatus according to claim 1, wherein said operation speed calculator is configured to calculate the channel selecting operation speed so that the calculated channel selecting operation speed becomes faster as a time interval between two successive channel selecting operations detected by said operation detector becomes shorter.

3. The broadcast receiving apparatus according to claim 1, wherein said operation speed calculator is configured to calculate the channel selecting operation speed so that the calculated channel selecting operation speed becomes faster with an increase in a count of the selecting operation detected by said operation detector in a predetermined period of time.

4. The broadcast receiving apparatus according to claim 1, wherein said operation detector is configured to detect a period of time for which a channel selecting operation is performed for a single channel, and
 said operation speed calculator is configured to calculate the channel selecting operation speed so that the calculated channel selecting operation speed becomes faster as the detected period of time becomes longer.

5. The broadcast receiving apparatus according to claim 2, wherein said list item count determiner is further configured to determine the number of channels using personal information of a user who performs the channel selecting operation.

6. The broadcast receiving apparatus according to claim 5, wherein said list item count determiner is configured to determine the number of channels such that the number of channels is larger, when an age of the user is equal to or above a predetermined first age and is below a second age that is above the first age, than when the age of the user is below the first age or is equal to or above the second age.

7. The broadcast receiving apparatus according to claim 5, wherein said list item count determiner is configured to determine, when an age of the user is equal to or above a predetermined age, the number of channels such that the number of channels decreases as the age of the user increases.

8. The broadcast receiving apparatus according to claim 5, wherein said list item count determiner is configured to determine the number of channels based on the time interval between the channel selecting operations by the user or on an actual count of the channel selecting operations by the user in a predetermined period of time so that the number of channels decreases as the time interval becomes shorter or the actual count increases.

9. A broadcast receiving apparatus according to claim 2, wherein said channel determiner is configured to determine the channels to be listed based on preferences in categories of the broadcast content to be displayed.

10. The broadcast receiving apparatus according to claim 9, wherein said channel determiner is configured to determine, when the preferences are switched, the channels to be listed according to the preferences after the switching.

11. The broadcast receiving apparatus according to claim 2, wherein said display is configured to output television program information of the determined channels to be listed so that the television program information of a channel, of the determined channels, is displayed in a larger size, as a preference in a category of the broadcast content on the channel becomes higher.

12. The broadcast receiving apparatus according to claim 2, wherein said operation detector is further configured to detect an operation other than the channel selecting operation, and
 said list item count determiner is configured to determine, when the operation is detected, a value predetermined in association with the operation, as the number of channels.

13. The broadcast receiving apparatus according to claim 2, wherein said channel determiner is configured to determine the channels to be listed so that television program information of a channel not yet output by said display is output instead of television program information of a channel selected from channels output by said display.

14. The broadcast receiving apparatus according to claim 2,
wherein said display is configured to output television program information so that television program information of a currently selected channel is displayed in a largest size among television program information of currently displayed channels.

15. The broadcast receiving apparatus according to claim 14,
wherein said display is configured to output television program information so that television program information of a channel is displayed in a larger size as the television program information of the channel becomes closer to television program information of the currently selected channel.

16. A method for broadcast reception in which broadcast content is received and information of the received broadcast content is output as television program information of a channel for which the broadcast content is received, said method comprising:
detecting a channel selecting operation;
calculating a channel selecting operation speed from the detected channel selecting operation;
determining, according to the calculated channel selecting operation speed, the number of channels for which the television program information is displayed;
determining channels to be listed so that the television program information is displayed for the determined number of channels; and
outputting the television program information of the determined channels to be listed,
wherein determining the number of channels comprises determining the number of channels such that the number of channels increases as the calculated channel selecting operation speed becomes faster.

17. A non-transitory computer readable recording medium on which a program for receiving broadcast content and outputting information of the received broadcast content as television program information of a channel for which the broadcast content is received is recorded, said program causing the computer to execute:
detecting a channel selecting operation;
calculating a channel selecting operation speed from the detected channel selecting operation;
determining, according to the calculated channel selecting operation speed, the number of channels for which the television program information is displayed;
determining channels to be listed so that the television program information is displayed for the determined number of channels; and
outputting the television program information of the determined channels to be listed,
wherein determining the number of channels comprises determining the number of channels such that the number of channels increases as the calculated channel selecting operation speed becomes faster.

18. An integrated circuit for controlling broadcast receiving apparatus which receives broadcast content and outputs information of the received broadcast content as television program information of a channel for which the broadcast content is received, said integrated circuit comprising:
an operation detector configured to detect a channel selecting operation;
an operation speed calculator configured to calculate a channel selecting operation speed from the detected channel selecting operation;
a list item count determiner configured to determine, according to the calculated channel selecting operation speed, the number of channels for which the television program information is displayed;
a channel determiner configured to determine channels to be listed so that the television program information is displayed for the determined number of channels; and
a display configured to output the television program information of the determined channels to be listed,
wherein said list item count determiner is configured to determine the number of channels such that the number of channels increases as the calculated channel selecting operation speed becomes faster.

19. The broadcast receiving method according to claim 16,
wherein determining the number of channels comprises determining the number of channels such that the number of channels is larger when an age of the user is equal to or above a predetermined first age and is below a second age that is above the first age, than when the age of the user is below the first age or is equal to or above the second age.

20. The broadcast receiving apparatus according to claim 18,
wherein said list item count determiner is configured to determine the number of channels such that the number of channels is larger, when an age of the user is equal to or above a predetermined first age and is below a second age that is above the first age, than when the age of the user is below the first age or is equal to or above the second age.

* * * * *